United States Patent
Yoscovich et al.

(10) Patent No.: US 12,506,339 B2
(45) Date of Patent: Dec. 23, 2025

(54) ELECTRIC-VEHICLE CHARGER ISOLATION

(71) Applicant: Solaredge Technologies Ltd., Herzeliya (IL)

(72) Inventors: Ilan Yoscovich, Givatayim (IL); Yakir Loewenstern, Ariel (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 18/412,514

(22) Filed: Jan. 13, 2024

(65) Prior Publication Data

US 2024/0243576 A1   Jul. 18, 2024

Related U.S. Application Data

(60) Provisional application No. 63/479,885, filed on Jan. 13, 2023.

(51) Int. Cl.
*H02J 3/00* (2006.01)
*B60L 53/22* (2019.01)
*H02J 3/02* (2006.01)

(52) U.S. Cl.
CPC ............ *H02J 3/0075* (2020.01); *B60L 53/22* (2019.02); *H02J 3/02* (2013.01); *B60L 2210/10* (2013.01);
(Continued)

(58) Field of Classification Search
CPC . H02J 3/0075; H02J 3/02; B60L 53/22; B60L 2210/10; B60L 2210/30; B60L 2210/40
(Continued)

(56) References Cited

U.S. PATENT DOCUMENTS

| 5,670,861 A | 9/1997 | Nor |
| 5,744,936 A | 4/1998 | Kawakami |

(Continued)

FOREIGN PATENT DOCUMENTS

| DE | 102005000979 A1 | 7/2006 |
| DE | 102015200276 A1 | 7/2016 |

(Continued)

OTHER PUBLICATIONS

M. S. Hossain Lipu et al., "Review of Electric Vehicle Converter Configurations, Control Schemes and Optimizations: Challenges and Suggestions," Electronics, 10, 477, Feb. 2021.
(Continued)

*Primary Examiner* — Hal Kaplan
(74) *Attorney, Agent, or Firm* — Banner & Witcoff, Ltd.

(57) ABSTRACT

One or more systems and methods for providing selective isolation between a grid and an electric vehicle (EV) during charging are disclosed. An isolation component may be located between input nodes, and one or more output nodes. The isolation component may be connected to the nodes by switches that select which one or more nodes is used to supply power for charging the EV battery. Other switches, such as relays, may bypass the isolation component when the grid is not connected. Further switches may isolate part of the system from the grid to connect the isolated power source to the EV, and in parallel connect the isolation component to the grid for combined power EV battery charging. The isolation component may comprise electrical energy storage devices with switches in series surrounding each device, where the switches may be operated in a break-before-make transition.

20 Claims, 24 Drawing Sheets

(52) U.S. Cl.
CPC ....... *B60L 2210/30* (2013.01); *B60L 2210/40* (2013.01)

(58) Field of Classification Search
USPC .......................................................... 307/9.1
See application file for complete search history.

(56) References Cited

U.S. PATENT DOCUMENTS

| | | | |
|---|---|---|---|
| 7,705,491 | B2 | 4/2010 | King et al. |
| 9,233,617 | B2 * | 1/2016 | Ichikawa ................ B60L 55/00 |
| 10,439,428 | B2 | 10/2019 | Kydd |
| 11,084,391 | B2 | 8/2021 | Rasmussen |
| 2011/0140535 | A1 | 6/2011 | Choi et al. |
| 2012/0029720 | A1 | 2/2012 | Cherian et al. |
| 2012/0249065 | A1 | 10/2012 | Bissonette et al. |
| 2014/0002023 | A1 | 1/2014 | Ichikawa |
| 2018/0358839 | A1 | 12/2018 | Perez et al. |
| 2019/0299799 | A1 | 10/2019 | Hinterberger et al. |

FOREIGN PATENT DOCUMENTS

| | | |
|---|---|---|
| EP | 2660924 A2 | 11/2013 |
| JP | 2013212023 A | 10/2013 |
| WO | 2018072799 A1 | 4/2018 |

OTHER PUBLICATIONS

C. Yao, "Semiconductor Galvanic Isolation Based Onboard Vehicle Battery Chargers," The Ohio State University, 2018.

Niti Aayog et al., "Handbook of Electric Vehicle Charging Infrastructure Implementation, Version-1".

M. U. Ali et al., "Towards a Smarter Battery Management System for Electric Vehicle Applications: A Critical Review of Lithium-Ion Battery State of Charge Estimation," Energies, 12, 446, Jan. 2019.

B. Zhao et al., "Overview of Dual-Active-Bridge Isolated Bidirectional DC-DC Converter for High-Frequency-Link Power-Conversion System," IEEE Transactions on Power Electronics, vol. 29, No. 8, Aug. 2014.

H. Ramakrishnan & J. Rangaraju, "Power Topology Considerations for Electric Vehicle Charging Stations," Texas Instruments Application Report, Sep. 2020.

D. Ronanki et al., "Extreme Fast Charging Technology—Prospects to Enhance Sustainable Electric Transportation," Energies, 12, 3721, Sep. 2019.

Z. Yu; "Capacitive Isolation: Fundamental Building Block in Future AC/DC Power Conversion"; Monolithic Power Systems; Dec. 6, 2021; retrieved from https://www.monolithicpower.com/en/capacitive-isolation-article.

May 27, 2024—European Search Report—EP. App. No. 24151889.3.

O. Habte, "Bidirectional Power Transfer between Grid and Electric Vehicle Batteries", University of Norway, May 2020.

W. Liu, et al.; "Overview of batteries and battery management for electric vehicles"; Energy Reports, vol. 8, Nov. 2022.

R. McGlothlin; "Improving EV Safety and Reliability with Galvanic Isolation"; PowerSystemsDesign, Jul. 22, 2019; retrieved from https://www.powersystemsdesign.com/articles/improving-ev-safety-and-reliability-with-galvanic-isolation/22/14838.

L. Teschler; "Galvanic Isolation for Electric Vehicle Systems"; Power Electronic Tips, Aug. 14, 2018; retrieved from https://www.powerelectronictips.com/galvanic-isolation-for-electric-vehicle-systems/.

S.S. Ravi and M. Aziz; "Utilization of Electric Vehicles for Vehicle-to-Grid Services: Progress and Perspectives"; Energies 2022, 15, 589; https://doi.org/10.3390/en15020589.

M. Keshani; "A Three-Phase Fully-Integrated Battery Charger for Electric Vehicles Offering Galvanic Isolation;" University of Toronto, Graduate Department of Electrical and Computer Engineering; 2019.

* cited by examiner

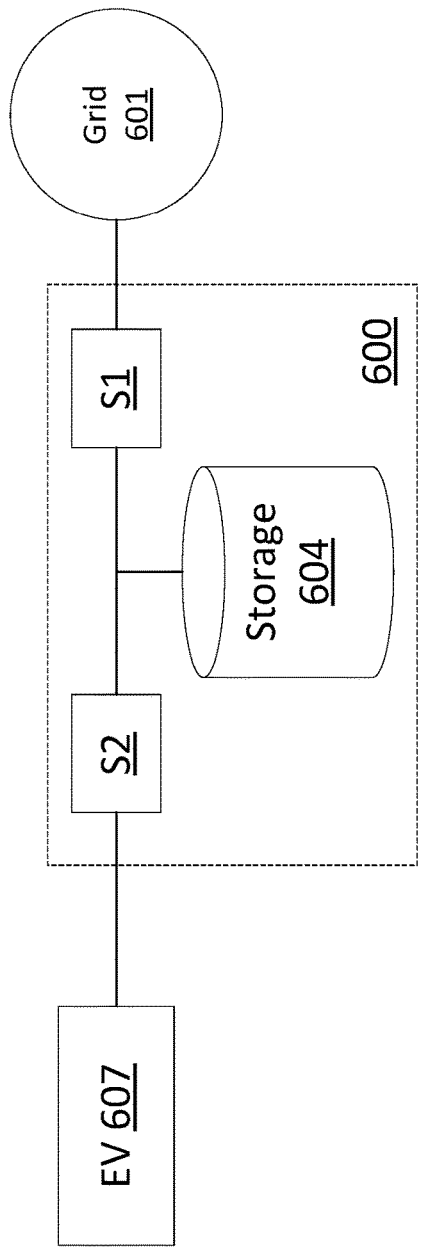
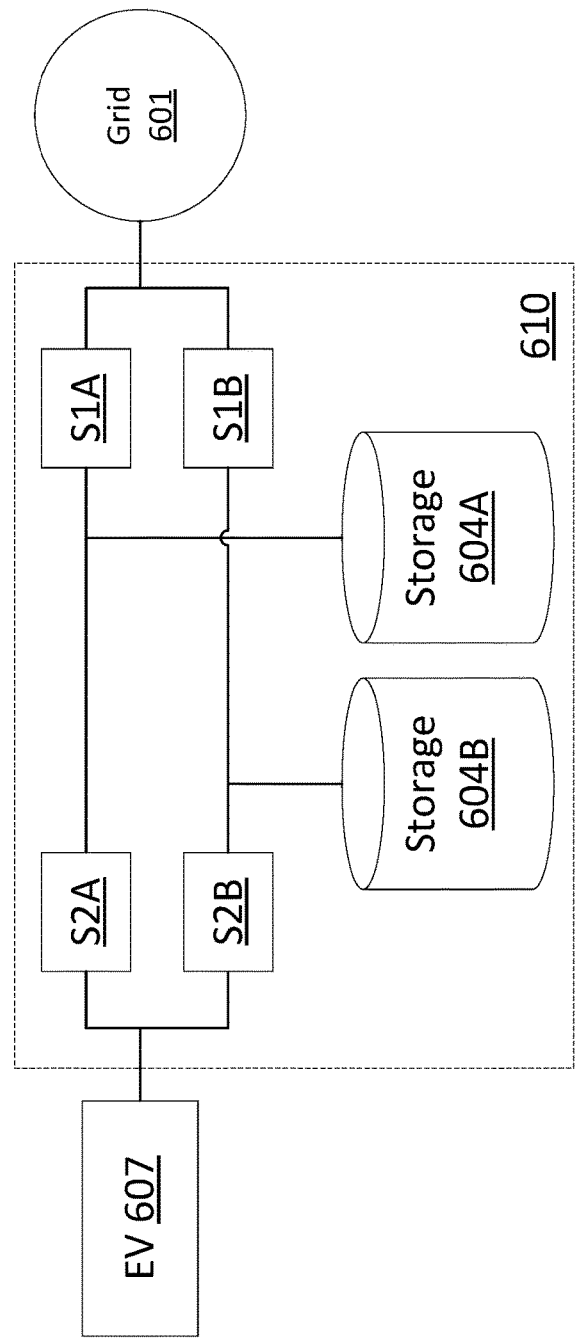

ELECTRIC-VEHICLE CHARGER ISOLATION

CROSS-REFERENCE TO RELATED APPLICATIONS

This application claims the benefit of U.S. Provisional Application No. 63/479,885, filed on Jan. 13, 2023. The above-referenced application is hereby incorporated by reference in its entirety.

BACKGROUND

Renewable power systems (e.g., photovoltaic, wind turbine, or hydro-electric systems, to name a few non-limiting examples) may feature a direct current to alternating current (DC/AC) inverter for converting direct current (DC) power generated by renewable power sources to alternating current (AC) for consumption by electrical loads and/or for providing power to an electrical grid. Electrical vehicles (EVs) may be rechargeable by home-charging circuits that may provide AC and/or DC power to the EV on-board energy storage, such as batteries. Power systems at certain locations (e.g., homes) may include both an inverter and an EV charger, which may feature separate enclosures, separate control, monitoring and/or communication devices, and separate electronic circuits.

SUMMARY

The following summary is a short summary of some of the inventive concepts for illustrative purposes only, and is not intended to limit or constrain the inventions and examples in the detailed description. One skilled in the art will recognize other combinations and features from the detailed description.

Disclosed are circuits, methods, devices, components, and systems for isolating between a utility grid and an electric vehicle (EV) during charging of the EV using an isolation component. The isolation component may include switches to allow connecting the input of the isolation component to the utility grid (directly or indirectly) when advantageous, or disconnected when not advantageous (such as when the utility grid is disconnected from the power system providing EV charging power). The isolation component may include switches for connecting the power source nodes to the EV without using the isolation component.

The isolation component may include an isolation transformer with H-bridges (electronic circuits that switch the polarity of voltages). For example, a direct current to direct current (DC-DC) isolation transformer may be used with the disclosed methods, circuits, and the circuit components (such as capacitors, switches, relays, resistors, and the like) to provide isolation between a utility grid and an EV when advantageous in residential and commercial EV charging systems. The DC-DC isolation transformer may be used with switches to various input-output (I/O) nodes, where the switches connect each I/O node to a winding of the transformer individually, in parallel with other nodes, or in series with other nodes.

An isolation component may include storage devices with switches configured in a break-before-make (BBM) connection to transfer energy in an isolated transition between two nodes. For example, an energy storage device (such as a battery, a capacitor, a super-capacitor, a fuel cell, a flywheel, etc.) may be used with the disclosed methods, circuits and the circuit components (such as capacitors, switches, relays, resistors, and the like) to provide isolation and energy transfer between the EV and grids when advantageous in residential and commercial power systems.

Switches may be used to selectively configure the isolation component between any two or more I/O circuit nodes, thereby allowing the isolation component to be used for charging and discharging from multiple nodes of the apparatus. Other switches may be configured to connect the I/O circuit nodes without an isolation component when the grid is not connected, when the grid connection is not in use, or when the grid connection is not advantageous. A switch may disconnect the grid from the EV charging apparatus when the non-isolated connections are used. Switches may be relays or transistors depending on the electrical code requirements of the region where the EV charging is performed.

As noted above, this Summary is merely a summary of some of the features described herein and is provided to introduce a selection of concepts in a simplified form that are further described below in the Detailed Description. The Summary is not exhaustive, is not intended to identify key features or essential features of the claimed subject matter, and is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures.

FIG. 6A shows a block-diagram depicting a single storage-based isolation component.

FIG. 6B shows a block-diagram depicting a dual storage-based isolation component.

DETAILED DESCRIPTION

Figure 1A:
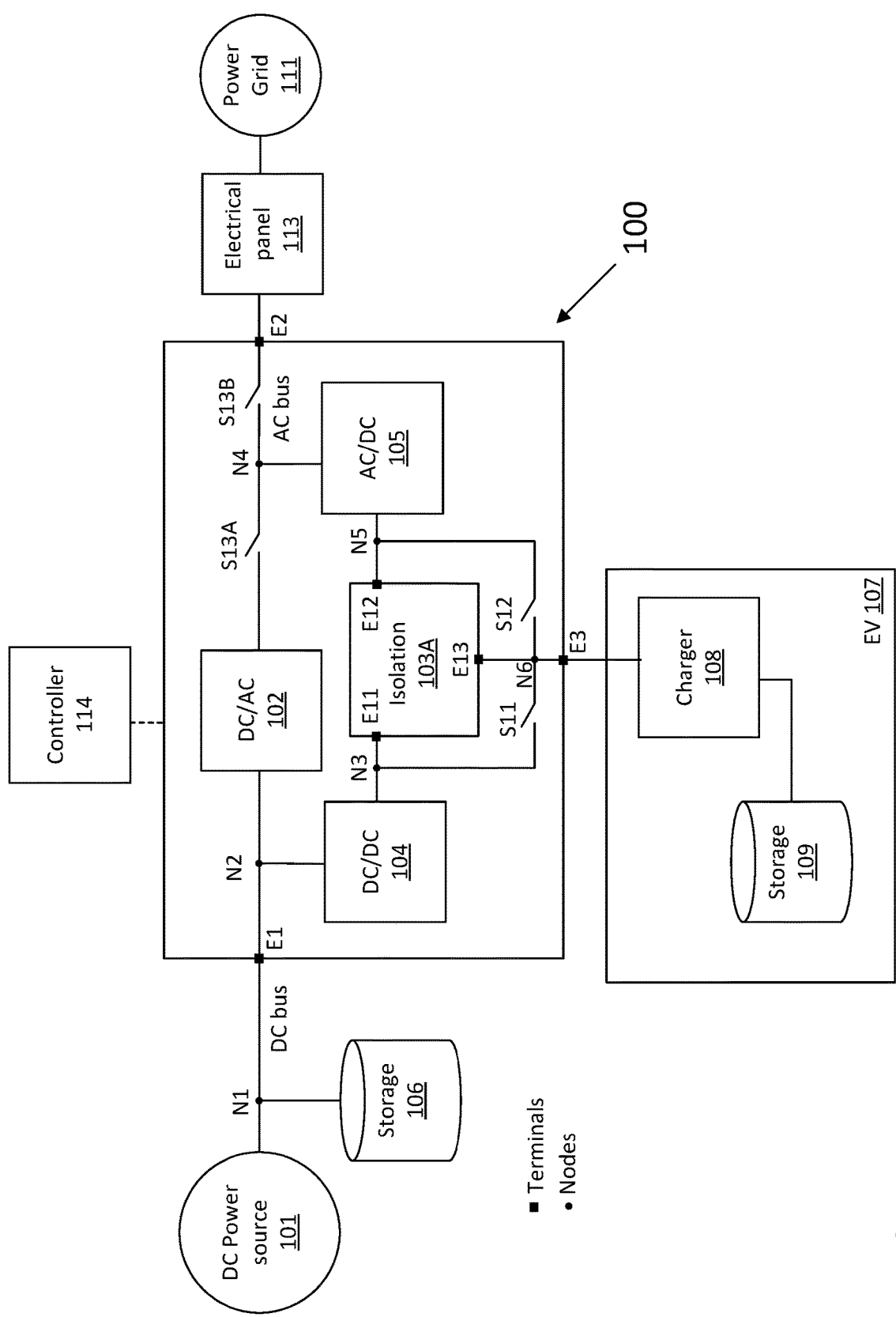
FIG. 1A shows a block-diagram depicting aspects of a power system with an isolation device between the grid and electric vehicle (EV).

Disclosed herein are systems, devices and methods for isolating between multiple power sources and multiple loads. The power transferred from the sources to the loads may be alternating current (AC) or direct current (DC). To enable the isolation between multiple sources and loads, one or more isolation components and a network of switches connect the isolation components to different sources and loads. The network of switches, which may also include relays or transistors, may be configured to connect the sources and loads without the isolation components to improve efficiency, reduce wear, limit faults of the isolation components, and increase the lifetime of the circuit. The isolation components may be isolation transformers. The isolation components may be break-before-make (BBM) electrical energy storage devices. The BBM technique for the electrical energy storage devices may be implemented using transistors or relays. Using multiple BBM electrical energy storage devices may have the advantage of providing more efficient power transfer from the sources to the loads. Electrical energy storage devices may include batteries, capacitors, supercapacitors, flywheels, or fuel cells. Electrical energy power sources may be a utility grid (e.g., AC), photovoltaic power generation systems (e.g., DC or AC), wind turbine power generation systems (e.g., high frequency AC, DC, or grid frequency AC), electrochemical batteries, gravity battery, compressed air/gas energy storage, or fuel cells.

Electric vehicle (EV) charging circuits connected to the grid may require isolation from the grid for safety when charging or discharging energy from the EV. Disclosed herein are systems, devices, and methods that provide a switchable isolation component between the grid and the EV when charging or discharging. The isolation component may have single or multiple inputs and outputs. The isolation component may be connected with switches to different sources and loads of the device to select the input and outputs of the isolation component. Sources include DC and AC power sources. Power sources may be combined into an AC bus or a DC bus. Power converters may be used to connect between sources and the AC or DC bus, or between the AC or DC bus and the isolation component. The converters may adjust the voltages to align between the sources, voltage lines (power buses), and EVs. The converters may be bidirectional to allow the flow of power between the EV and the sources capable of receiving power, such as a storage battery or the utility grid.

Isolation components may be selected from transformer and energy storage device types. Isolation components may combine transformers and energy storage devices. Isolation components may be directed to transfer AC power, DC power, or combined AC and DC power. Isolation components may be configured for transferring DC power up to an allowed DC power isolation capacity and transferring AC power up to an allowed AC power isolation capacity. Isolation components may be configured for transferring AC power at a grid frequency or at a non-grid frequency (such as from a turbine or generator).

In the following examples, a single EV may be used to illustrate the technical solutions, but multiple EVs may be substituted for the single EV in a relatively easy process by adding a multiple EV charger to the isolation devices between the isolation component and the charging terminals of the EVs. For example, the isolated power output of the isolation devices may be used to provide isolated power to multiple EV charging stations, such as EV charging stations external to the isolation device and EV(s). Similarly, an EV charging station may be added between the isolation device and the output terminals of the isolation device.

As the power flow may be bidirectional, the sources and the loads may be interchangeable. Therefore the use herein of the terms primary and secondary windings, or coils, may be used as an example of power flow in a particular direction, but it is understood that the power flow may be configured in the opposite direction as well. Similarly, the terms input and output are given as an example, and it is understood that the power may flow in the reverse direction, and the terms source and load may be applied in reverse to the terminals or nodes.

The following figures show illustrations of example combinations of the above technical solutions. The technical solutions show several combinations of the switches and relays used to show the utility of the solutions and synergy between the solutions.

Reference is now made to FIG. 1A, which shows a block-diagram depicting aspects of a power system with an isolation device 100 between the grid 111 and electric vehicle (EV) 107. Isolation device 100 may include terminals E1, E2, and E3 configured to connect to a DC power source 101, a power grid 111, and an EV 107, respectively. DC power source 101 may be connected to a DC bus. An electrical energy storage device 106 may be connected to the DC bus in parallel to the DC power source 101 at circuit node N1. DC bus may be connected to the terminals E1 of isolation device 100. Power grid 111 may be connected to an electrical panel 113, such as a distribution board, a distribution panel, or a circuit breaker panel. Electrical panel 113 may be connected to terminal E2 of isolation device 100. EV 107 may include electrical energy storage device 109 and a charger 108. EV 107 may be connected to terminal E3 of isolation device 100.

Single connecting lines may represent electrical connections, circuit nodes, and terminals of drawings in this application schematically, but the number of physical electrical lines (conductors) and terminals may be two or more for each schematic line representation, depending on the type of power being transferred. For example, when transferring DC power the single lines may represent two power conductors and two terminals, one conductor and terminal for a positive voltage and one conductor and terminal for a negative voltage. For example, when transferring single phase AC power the single lines may represent two power conductors and two terminals, one conductor and terminal for a line voltage and one line and terminal for a neutral voltage. For example, when transferring two phase AC power the single lines may represent three power conductors and three terminals, two conductors and terminals for two line voltages (at the same or different phases) and one conductor and terminal for a neutral voltage. For example, when transferring three phase AC power the single lines may represent four power conductors and four terminals, three conductors and terminals for three line voltages (at different phases) and one conductor and terminal for a neutral voltage.

Similarly to the electrical connection lines and terminals of the block diagrams, the nodes of the block diagram may represent multiple physical circuit nodes, one for each voltage of the power transmission type (e.g., DC, AC single phase, AC dual voltage, AC three phase, etc.). In addition to the conductors, terminals, and circuit nodes for each voltage, there may be one or more conductors, terminals, and nodes for ground potential (earth potential). References for circuit nodes (N1-NX) and terminals (E1-EX) may be shared across figures, but the references are specific for each figure. Use of similar circuit node and terminal references does not mean these are the same or similar circuit nodes and terminals. The conventions disclosed in this paragraph may apply to other figures of this application.

Isolation device 100 may include circuit node N2 connected to terminal E1. A DC/DC power converter 104 may be connected between circuit node N2 and circuit node N3. Circuit node N4 may be connected to an AC bus and to terminal E2 using a switch S13B. A DC/AC converter 102 may be connected in series with switch S13A between circuit node N2 and circuit node N4. An AC/DC converter 105 may be connected between circuit node N4 and circuit node N5. An isolation component 103A may be connected between power source circuit nodes N3 and N5 and load circuit node N6 using terminals E11, E12, and E13 of isolation component 103A, respectively. Circuit node N6 may be connected to terminal E3. Switch S11 may be used to connect the output of DC/DC converter 104 at circuit node N3 to circuit node N6 when isolation is not advantageous. Isolation component 103A may be a switchable isolation component, such as a single-input single-output isolation component where the input may be switched between accepting input from E11 or E12 as described in detailed aspects hereinbelow. Isolation component 103A may comprise a dual-input single-output isolation component that may accept power simultaneously from DC/DC converter 104 using circuit node N3 and from AC/DC converter 105 using circuit node N5.

Isolation device 100 may include controller 114 to control the operation of switches (e.g., S13A, S13B, S11, and S12), switchable isolation component 103A, and converters (e.g., 102, 104, and 105). Controller 114 may be incorporated in isolation device 100 or in another device in communication with isolation device 100 and configured to control the operation of the switches (e.g., S13A, S13B, S11, and S12), switchable isolation component 103A, and converters (e.g., 102, 104, and 105). As used here, the term controller means an analog or digital sub-circuit that is configured to control the operation of the circuit, such as by controlling the opening and closing of switches. It is understood that the switches disclosed herein have an associated controller that controls the opening and closing of the switches, and the controllers may be individual for each switch or combined controllers for controlling more than one switch. For example, one or more controller is configured to control the operation of switches used for the converters and isolation transformers (H-bridges). For example, one or more controller may be used to control the operation of all switches within a device or system.

Switch S12 may be controlled to connect the output of AC/DC converter 105 at circuit node N5 to circuit node N6 when isolation is not advantageous for this current path. As used herein, the term current path means the path through conductors that a current will take. For example, when DC bus (circuit node N2) is not connected to power grid 111, such as when switch S13A or switch S13B is open, switch S11 may be closed to connect the output of DC/DC converter 104 to the EV 107. For example, when switch S13A is closed and switch S13B is open, switches S11 and S12 may be closed to connect the outputs of DC/DC converter 104 and AC/DC converter 105 to node N6, thereby not using the isolation component 103A when not advantageous. Switches S13A, S13B, S11, and S12 may be implemented with electromechanical relays.

For example, the following TABLE 1 shows the allowed configuration of switches for different power supply scenarios of FIG. 1A. The terms open and closed states of switches mean non-conducting and conducting respectively.

TABLE 1

Switch configurations for FIG. 1A.

| Configuration | S11 state | S12 state | S13A state | S13B state | Scenario |
|---|---|---|---|---|---|
| 1 | Open | Open | Closed | Closed | AC/DC isolated |
| 2 | Closed* | Open | Open | Closed | AC isolated |
| 3 | Closed* | Closed** | Closed | Open | Not isolated |

*when DC power used;
**when AC power used

For example, when the grid is not connected, configurations 2 and 3 may be used to send power from the DC power source 101 to the EV 107 without using the isolation component 103A. For example, configuration 1 may be used when the DC power source 101 is producing more power than needed by the EV 107 charging, and the DC power is used for EV 107 charging and to feed the excess power to the utility grid. For example, when the DC power source 101 is not producing enough power for EV 107 charging, configuration 2 may be used to supply power from the DC power source 101 without using the isolation component 103A and supply power from the utility grid using the AC/DC converter 105 and the isolation component 103A.

Figure 1B:
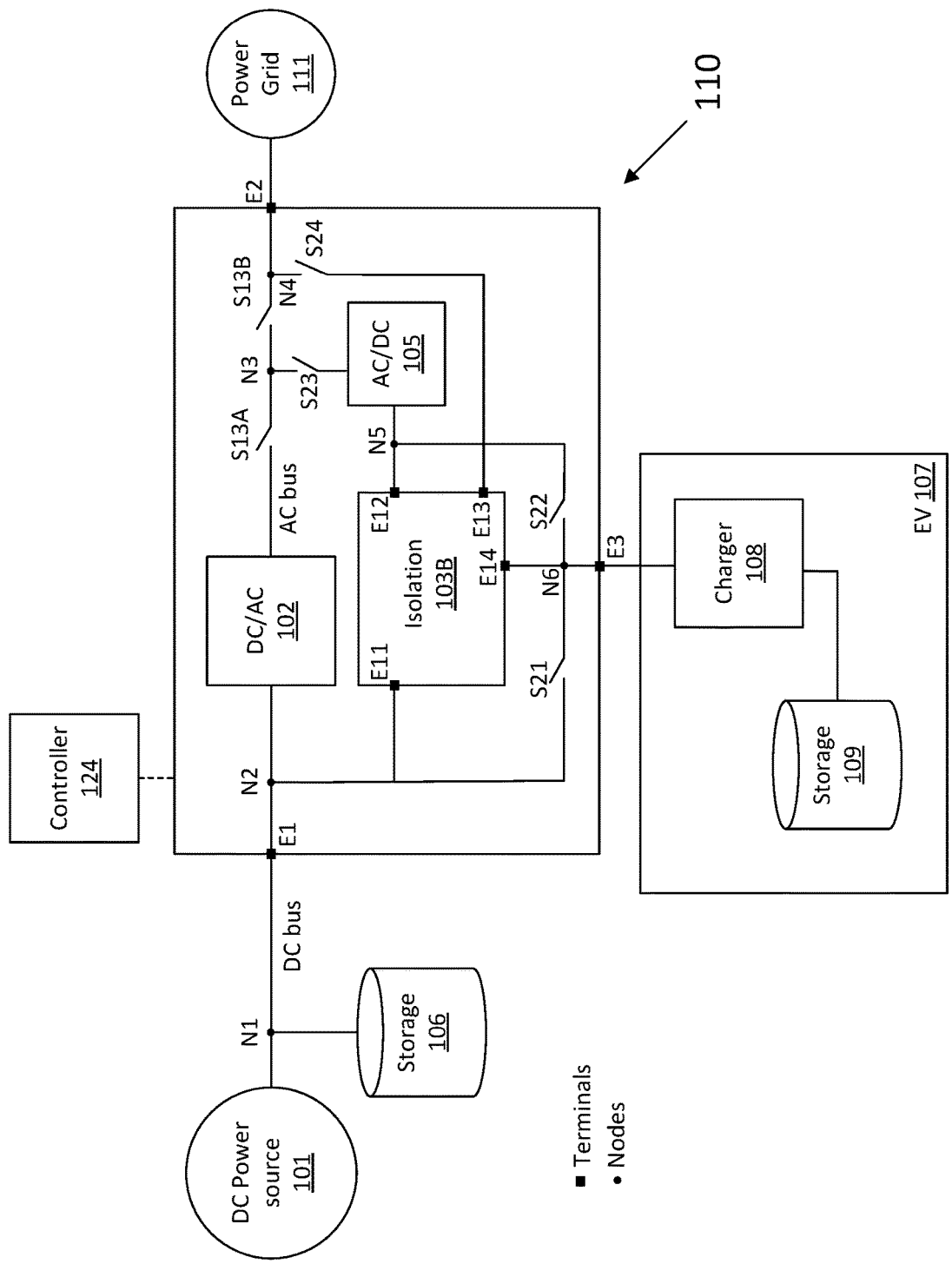
FIG. 1B shows a block-diagram depicting an isolation device associated with a direct current (DC) bus.

Reference is now made to FIG. 1B, which shows a block-diagram depicting isolation device 110 aspects associated with a direct current (DC) bus. Isolation device 110 may include terminal E1 configured to connect to a DC power source 101, terminals E2 configured to connect to a power grid 111, and terminal E4 configured to connect to an EV 107. DC power source 101 and electrical energy storage 106 may be connected to a DC bus at circuit node N1. DC bus may be connected to the terminal E1 of an isolation device 110. Power grid 111 may be connected (possibly through an electrical panel, a distribution board, a distribution panel, or a circuit breaker panel) to terminal E2 of isolation device 110. EV 107 may include electrical energy storage device 109 and a charger 108. EV 107 may be connected to terminal E3 of isolation device 110.

Isolation device 110 may include controller 124 to control the operation of switches (e.g., S13A, S13B, S21, S22, S23, and S24), isolation component 103B, and converters (e.g., 102 and 105). Controller 124 may be incorporated in isolation device 110 or in another device in communication with isolation device 110 and configured to control the operation of the switches (e.g., S13A, S13B, S21, S22, S23, and S24), isolation component 103B, and converters (e.g., 102 and 105).

Isolation device 110 may include circuit node N2 connected to terminal E1. Circuit nodes N3 and N4 may be connected to an AC bus and to terminal E2. Switch S13B may be located between circuit nodes N3 and N4. A DC/AC converter 102 may be connected in series with switch S13A between circuit node N2 and circuit node N3. AC/DC converter 105 may be connected between circuit node N3 and circuit node N5. An isolation component 103B may be connected between power source circuit nodes N2, N4, and N5 and load circuit node N6 using terminals E11, E13, E12, and E14 of isolation component 103B, respectively. Circuit node N6 may be connected to terminal E3. Switch S21 may be used to connect circuit node N2 to circuit node N6 when isolation is not advantageous for this current path. Isolation component 103B may be a switchable isolation component, such as a single-input single-output isolation component where the input to the isolation component 103B may be switched between accepting input from E11, E12, or E13 as described in detailed aspects hereinbelow. Isolation component 103B may comprise a dual-input single-output isolation component that may accept DC power from circuit node N2 or from AC/DC converter 105 using circuit node N5 simultaneously with AC power input from circuit node N4 when switch S24 is closed. Isolation component 103B may comprise a triple-input single-output isolation component that may simultaneously accept DC power from circuit node N2, accept DC power from AC/DC converter 105 using circuit node N5, and accept AC power input from circuit node N4 when switch S24 is closed.

Switches S21 or S22 may be closed when isolation component 103B is not advantageous for receiving power from circuit nodes N2 or N5, respectively. For example, switch S22 may be used to connect the output of AC/DC converter 105 at circuit node N5 to circuit node N6 when isolation is not advantageous for this current path, such as when power grid is not connected or when switch S13B is open. For example, when DC bus (circuit node N2) is not connected to power grid 111, such as when switch S13A or switch S13B is open, switch S21 may be closed to connect circuit node N2 to the EV 107 using circuit node N6. For example, when switch S13A is closed and switch S13B is open, switches S21, S22, and S23 may be closed to connect circuit node N2 and the output of AC/DC converter 105 to node N6, thereby not using the isolation component 103B when not advantageous for current paths that are isolated from the power grid 111. Switch S23 may be closed when AC/DC converter is used to provide power to EV 107. Switch S24 may be closed when AC power from the power grid 111 is supplied to the EV 107 through the switchable isolation component 103B using terminal E13. Switches S13A, S13B, S21, S22, S24, and S24 may be implemented with electromechanical relays.

For example, the following TABLE 2 shows the allowed configuration of switches for different power supply scenarios of FIG. 1B. The terms open and closed states of switches mean non-conducting and conducting, respectively.

TABLE 2

Switch configurations for FIG. 1B.

| Configuration | S21 | S22 | S23 | S24 | S13A | S13B | Scenario |
|---|---|---|---|---|---|---|---|
| 1 | Open | Open | Closed* | Closed* | Closed | Closed | AC/DC isolated |
| 2 | Closed | Open | Closed* | Closed* | Open | Closed | AC isolated |
| 3 | Closed | Closed | Closed | Open | Closed | Open | Not isolated |
| 4 | Closed | Open | Open | Closed | Open | Open | AC isolated 2 |

TABLE 2-continued

Switch configurations for FIG. 1B.

| Configuration | S21 | S22 | S23 | S24 | S13A | S13B | Scenario |
|---|---|---|---|---|---|---|---|
| 5 | Closed | Closed | Closed | Closed | Closed | Open | AC isolated 3 |

*based on requirements

For example, when the grid is not available, configuration 2 may be used to send power from the DC power source 101 to the EV 107 without using the isolation component 103B. For example, configuration 1 may be used when the DC power source 101 is producing more power than needed by the EV 107 charging, and the DC power is used for EV 107 charging and to feed the excess power to the utility grid. For example, such as when the DC power source 101 is not producing enough power for EV 107 charging, configuration 2 may be used to supply power from the DC power source 101 without using the isolation component 103B and supply power from the utility grid using the AC/DC converter 105 and the isolation component 103B or directly from the AC bus using switch S24. For example, when the grid is not available, configuration 3 may be used to send power from the DC power source 101 to the EV 107 without using the isolation component 103B. For example, configuration 4 is used to supply power from the DC power source without isolation, and AC power directly through the isolation component 103B. For example, configuration 5 is used to supply power from the DC power source without isolation both directly and through converters 102 and 105, and AC power directly through the isolation component 103B.

Figure 1C:
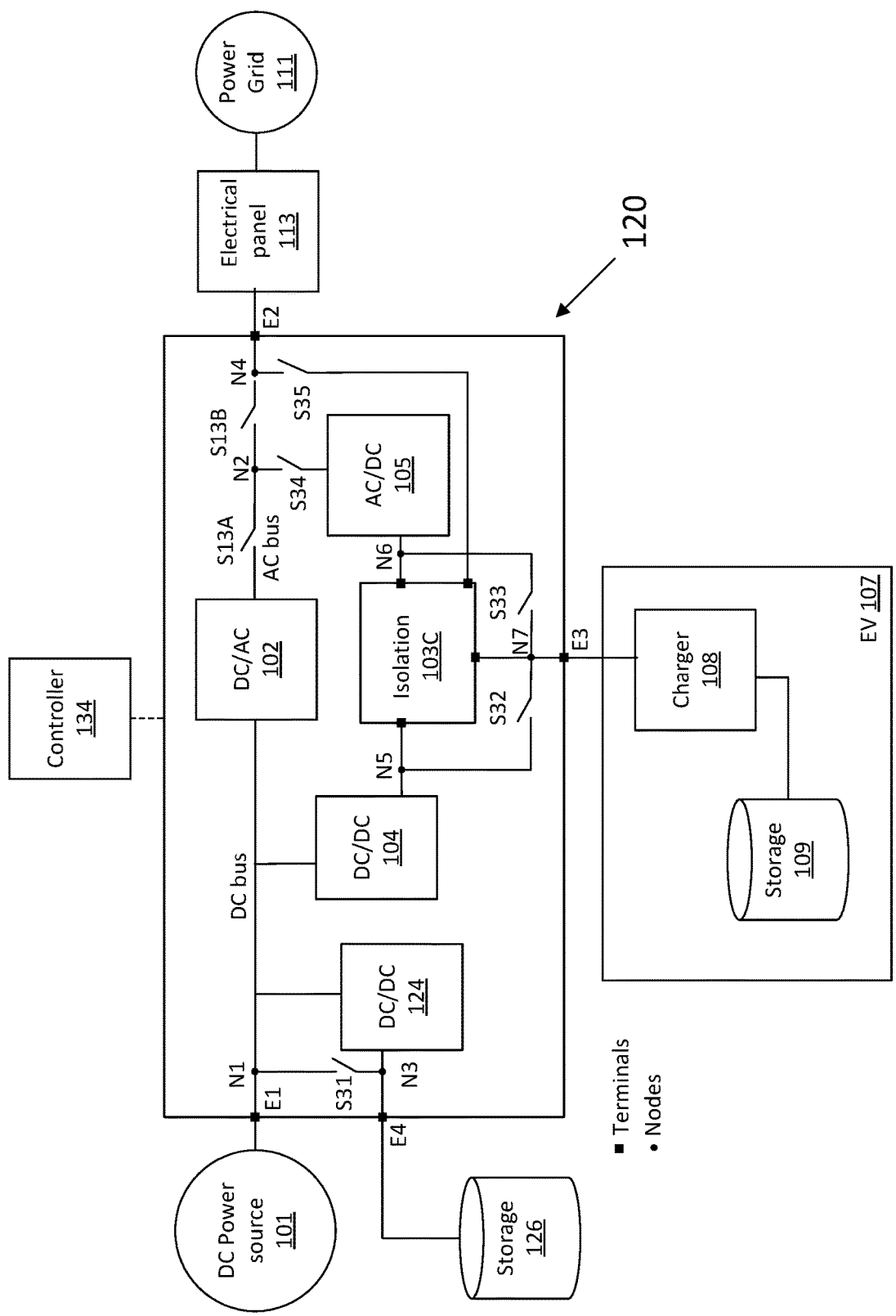
FIG. 1C shows a block-diagram depicting an isolation device associated with a DC bus with switchable storage device.

Reference is now made to FIG. 1C, which shows a block-diagram depicting isolation device 120 for a DC bus with switchably connected storage device 126. Isolation device 120 may include terminals E1, E2, E3, and E4 configured to connect to a DC power source 101, a power grid 111, an EV 107, and electrical energy storage device 126, respectively. Terminal E1 may be connected to a DC bus of the isolation device 120, such as at circuit node N1. An electrical energy storage device 126 may be connected to the DC bus within the isolation device 120, such as by using a switch S31 between circuit node N1 and circuit node N3. Power grid 111 may be connected to an electrical panel 113, such as a distribution board, a distribution panel, or a circuit breaker panel. Electrical panel 113 may be connected to terminal E2 of isolation device 120. EV 107 may include electrical energy storage device 109 and a charger 108. EV 107 may be connected to terminal E3 of isolation device 120.

A DC/DC power converter 104 may be connected between circuit node N1 and circuit node N5. A DC/DC power converter 124 may be connected between circuit node N1 and circuit node N3 in parallel to switch S31. When DC/DC power converter 124 is not advantageous, such as when the voltage on terminal E1 is the same as the voltage on terminal E4, switch S31 may be closed and DC/DC power converter 124 may be disabled. When the voltage across terminal E1 is different from the voltage across terminal E4, switch S31 may be opened and DC/DC power converter 124 may be enabled to convert between the two voltages using buck mode or boost mode voltage conversion circuits as advantageous. Circuit node N2 and circuit node N4 may be connected at an AC bus and to terminal E2 using switches S13A and switch S13B. A DC/AC converter 102 may be connected in series with switch S13A between circuit node N1 and circuit node N2. An AC/DC converter 105 may be connected between circuit node N2 and circuit node N6. An isolation component 103C may be connected between power source circuit nodes N5 and N6 and load circuit node N7 using the terminals of isolation component 103C (such as E11, E12, and E13 of FIG. 1B). Switch S32 may be used to connect the output of DC/DC converter 104 at circuit node N5 to circuit node N7 when isolation is not advantageous for this current path. Isolation component 103C may be a switchable isolation component, such as a single-input single-output isolation component where the input may be switched between accepting input from circuit nodes N5 or N6 as described in detailed aspects hereinbelow. Isolation component 103C may comprise a dual-input single-output isolation component that may accept power simultaneously from DC/DC converter 104 using circuit node N5 and from AC/DC converter 105 using circuit node N6.

Switch S33 may be used to connect the output of AC/DC converter 105 at circuit node N6 to circuit node N7 when isolation is not advantageous for this current path. For example, when DC bus (e.g., circuit node N1) is not connected to power grid 111, such as when switch S13A or switch S13B is open, switch S32 may be closed to connect the output of DC/DC converter 104 to the EV 107. For example, when switch S13A is closed and switch S13B is open, switches S32 and S33 may be closed to connect the outputs of DC/DC converter 104 and AC/DC converter 105 to node N7, thereby not using the isolation component 103C when not advantageous. Switches S13A, S13B, S32, S33, S34, and S35 may be implemented with electromechanical relays.

Isolation device 120 may include controller 134 to control the operation of switches (e.g., S13A, S13B, S31, S32, S33, S34, and S35), isolation component 103C, and converters (e.g., 102, 124, 104, and 105). Controller 134 may be incorporated in isolation device 120 or in another device in communication with isolation device 120 and configured to control the operation of the switches (e.g., S13A, S13B, S31, S32, S33, S34, and S35), isolation component 103C, and converters (e.g., 102, 124, 104, and 105).

For example, TABLE 2 shows allowed configuration of switches mutatis mutandis for different scenarios of FIG. 1C. In addition, S31 may be open to allow using DC/DC converter 124 to provide voltage conversion between the storage 126 and the DC bus, or closed to provide power directly between the storage 126 and the DC bus.

Figure 1D:
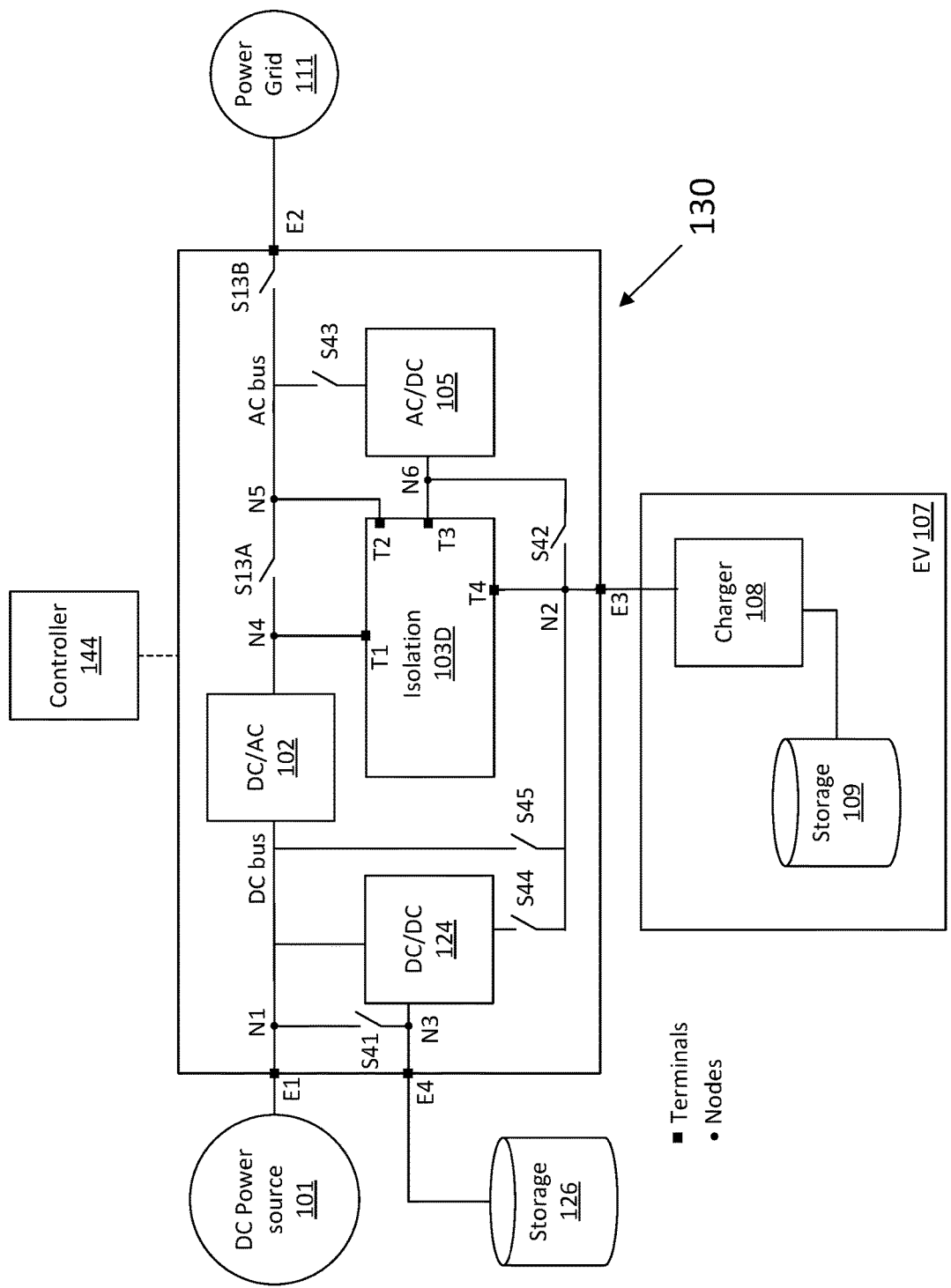
FIG. 1D shows a block-diagram depicting an isolation device associated with an alternating current (AC) bus.

Reference is now made to FIG. 1D, which shows a block-diagram depicting isolation device 130 from an alternating current (AC) bus. Isolation device 130 may include terminals E1, E2, E3, and E4 configured to connect to a DC power source 101, a power grid 111, an EV 107, and electrical energy storage device 126, respectively. Terminal E1 may be connected to a DC bus of the isolation device 130, such as at circuit node N1. An electrical energy storage device 126 may be connected to the DC bus within the isolation device 130, such as by using a switch S41 between circuit node N1 and circuit node N3. Power grid 111 (or the DC power source 101) may be connected to an electrical panel, such as a distribution board, a distribution panel, or a circuit breaker panel. Power grid 111 may be connected to terminal E2 of isolation device 130. EV 107 may include electrical energy storage device 109 and a charger 108. EV 107 may be connected to terminal E3 of isolation device 130.

Circuit node N1 may be connected to circuit node N2 using switch S45. A DC/DC power converter 124 may be connected in series with switch S44 between circuit node N1 and circuit node N2, and connected in parallel to switch S45. When DC/DC power converter 124 is not advantageous, such as when the voltage on terminal E1 is the same as the voltage on terminal E4, switch S41 may be closed and DC/DC power converter 124 may be disabled. When the voltage across terminal E1 is different from the voltage across terminal E4, switch S31 may be opened and DC/DC power converter 124 may be enabled to convert between the two voltages using buck mode or boost mode voltage conversion circuits as may be advantageous. Circuit node N4 and circuit node N5 may be connected at an AC bus and to terminal E2 using switches S13A and switch S13B. A DC/AC converter 102 may be connected in series with switch S13A between circuit node N1 and circuit node N4. AC/DC converter 105 may be connected in series with switch S43 between circuit node N5 and circuit node N6. An isolation component 103D may be connected between power source circuit nodes N4, N5, and N6 and load circuit node N2 using the terminals of isolation component 103D using terminals T1, T2, T3, and T4, respectively. Switch S45 may be used to connect circuit node N1 to circuit node N2 when isolation is not advantageous for this current path. Isolation component 103D may be a switchable isolation component, such as a dual-input single-output isolation component where a first input may be switched between accepting input from circuit nodes N4 or N5 (AC power input) and a second input for transferring power from N6 (DC power) to circuit node N2. Isolation component 103D may comprise a triple-input single-output isolation component that may transfer power simultaneously from AC bus using circuit node N5 and from AC/DC converter 105 using circuit node N6.

Switch S42 may be used to connect the output of AC/DC converter 105 at circuit node N6 to circuit node N7 when isolation is not advantageous for this current path. For example, when DC bus (e.g., circuit node N1) is not connected to power grid 111, such as when switch S13A or switch S13B is open, switch S45 may be closed to connect the DC bus to the EV 107. For example, when switch S13A is closed and switch S13B is open, switches S42, S43, and S45 may be closed to connect the DC bus and AC/DC converter 105 to node N7, thereby not using the isolation component 103D when not advantageous. Switches S13A, S13B, S42, S43, S44, and S45 may be implemented with electromechanical relays.

Isolation device 130 may include controller 144 to control the operation of switches (e.g., S13A, S13B, S41, S42, S43, S44, and S45), isolation component 103D, and converters (e.g., 102, 124, 104, and 105). Controller 144 may be incorporated in isolation device 130 or in another device in communication with isolation device 130 and configured to control the operation of the switches (e.g., S13A, S13B, S31, S32, S33, S34, and S35), isolation component 103D, and converters (e.g., 102, 124, 104, and 105).

Similar to the scenarios of TABLE 1 and TABLE 2, the switches of FIG. 1D may be configured to states that allow different uses of the isolation component 103D, mutatis mutandis. Switches S41, S44, and S45 may be used for transferring power between the storage 126 and the EV 107, depending on when the DC/DC converter 124 is advantageous to convert the voltage of the storage 126 or DC bus to the voltage advantageous by the EV 107 for charging.

Figure 1E:
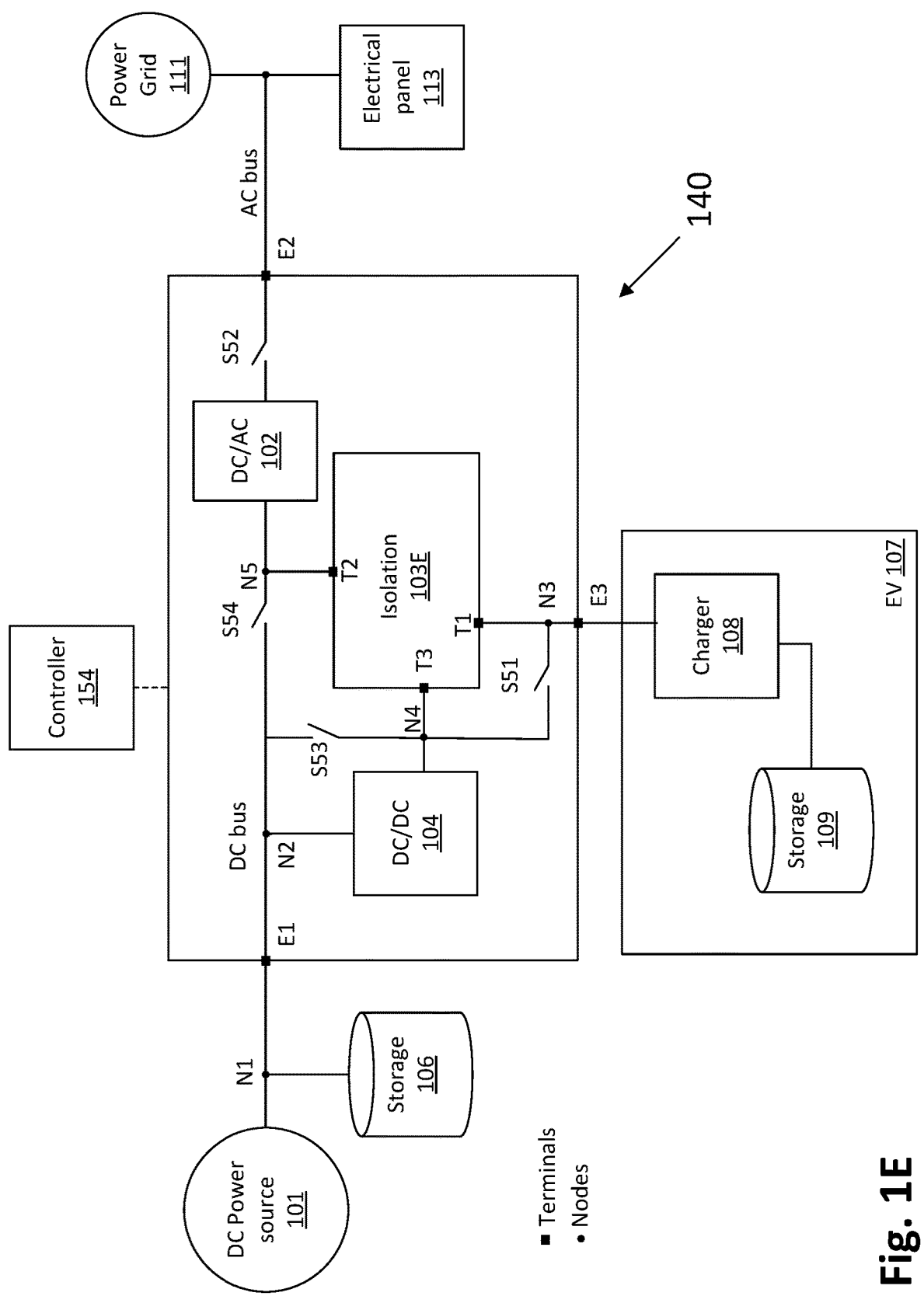
FIG. 1E shows a block-diagram depicting an isolation device associated with a DC-only input.

Reference is now made to FIG. 1E, which shows a block-diagram depicting isolation device 140 from a primary DC input. Isolation device 140 may include terminals E1, E2, and E3 configured to connect to a DC power source 101, a power grid 111, and an EV 107, respectively. Terminal E1 may be connected to a DC bus of the isolation device 140, such as at circuit node N2. An electrical energy storage device 106 may be connected to the DC bus external to the isolation device 140, such as to circuit node N1. Power grid 111 may be connected to an electrical panel 113, such as a distribution board, a distribution panel, or a circuit breaker panel. Power grid 111 may be connected to terminal E2 of isolation device 130, such as in a utility side interconnect. EV 107 may include electrical energy storage device 109 and a charger 108. EV 107 may be connected to terminal E3 of isolation device 140.

Circuit node N1 may be connected to circuit node N2. A DC/DC power converter 104 may be connected between circuit node N2 and circuit node N4, and connected in parallel to switch S53. When DC/DC power converter 104 is not advantageous, such as when the voltage on terminal E1 is the same as the voltage on circuit node N4, switch S53 may be closed and DC/DC power converter 104 may be disabled. When the voltage across terminal E1 is different from the voltage on terminal T3, switch S53 may be opened and DC/DC power converter 104 may be enabled to convert between the two voltages using buck mode and/or boost mode voltage conversion circuits as advantageous. Circuit node N2 and circuit node N5 may be connected using switch S54. A DC/AC converter 102 may be connected in series with switch S52 between circuit node N5 and terminal E2. An isolation component 103E may be connected between power source circuit nodes N4 and N5 and load circuit node N3 using the terminals of isolation component 103E using terminals T3, T2, and T1, respectively. Switch S51 may be used to connect circuit node N4 to circuit node N3 when isolation is not advantageous for this current path, such as when switch S52 is open. Isolation component 103E may be a switchable isolation component, such as a single-input single-output isolation component where the input may be switched between accepting input from circuit nodes N4 or N5. Isolation component 103E may comprise a dual-input single-output isolation component that may transfer power simultaneously from nodes N4 and N5. Switches S51, S52, S53, and S54 may be implemented with electromechanical relays.

Isolation device 140 may include controller 154 to control the operation of switches (e.g., S51, S52, S53, and S54), isolation component 103E, and converters (e.g., 102 and 104). Controller 154 may be incorporated in isolation device 140 or in another device in communication with isolation device 140 and configured to control the operation of the switches (e.g., S51, S52, S53, and S54), isolation component 103E, and converters (e.g., 102 and 104).

For example, the following TABLE 3 shows the allowed configuration of switches for different power supply scenarios of FIG. 1E. The terms open and closed states of switches mean non-conducting and conducting, respectively.

TABLE 3

Switch configurations for FIG. 1E.

| Configuration | S51 state | S52 state | S53 state | S54 state | Scenario |
|---|---|---|---|---|---|
| 1 | Open | Closed | Closed* | Closed | AC/DC isolated |
| 2 | Closed | Closed | Closed* | Open | AC isolated |
| 3 | Closed | Open | Closed* | Open | Not isolated |

*based on requirements

For example, configuration 1 may be used when the DC power source 101 is producing more power than needed by the EV 107 charging, and the DC power is used for EV 107 charging and to feed the excess power to the utility grid 111. For example, when the DC power source 101 is not producing enough power for EV 107 charging, configuration 2 may be used to supply power from the DC power source 101 without using the isolation component 103E and supply power from the utility grid 111 using the AC/DC converter 105 and the isolation component 103E. For example, configuration 3 may be used to send power from the DC power source 101 to the EV 107 without using the isolation component 103E.

Figure 1F:
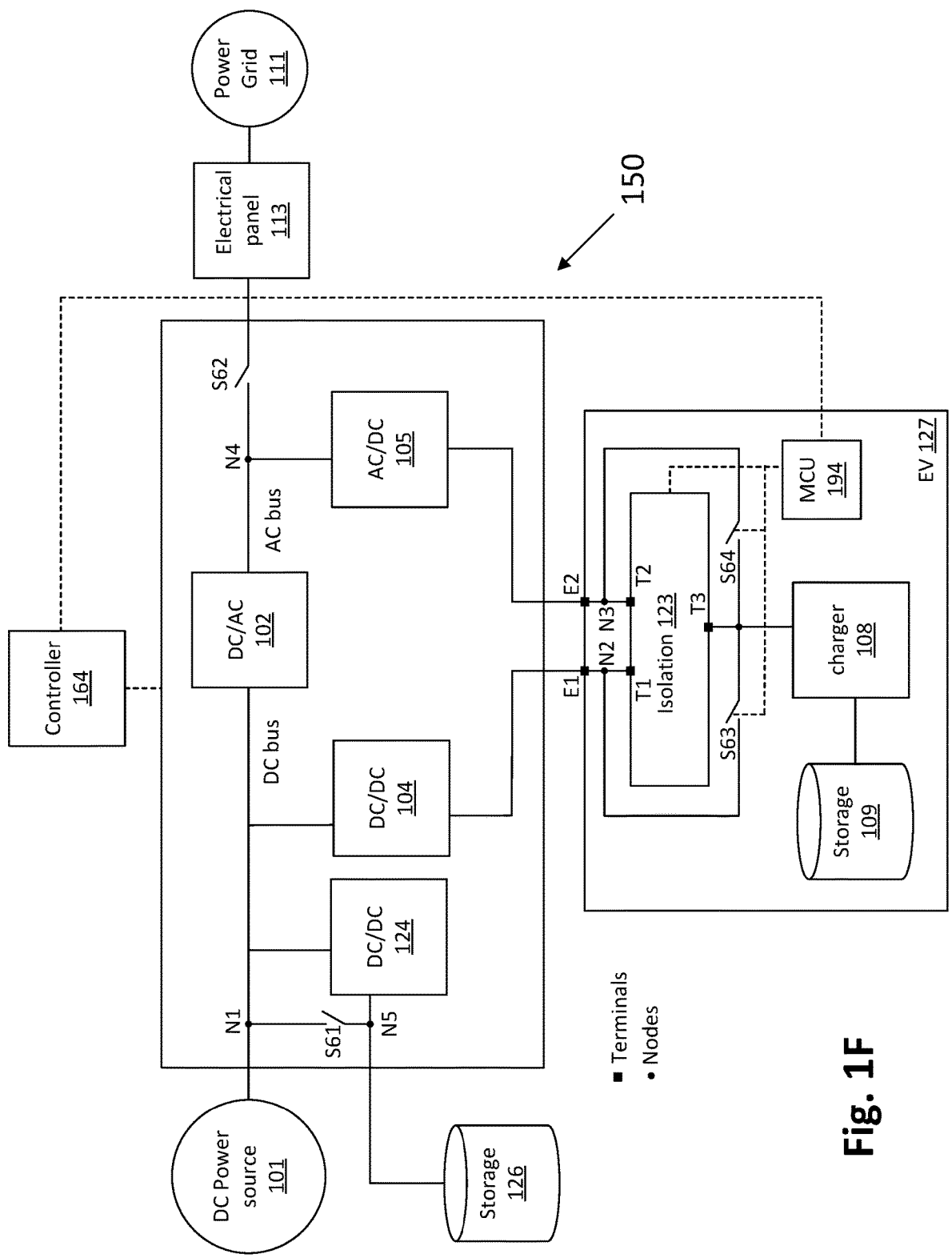
FIG. 1F shows a block-diagram depicting EV onboard isolation.

Reference is now made to FIG. 1F, which shows a block-diagram depicting EV onboard isolation 123. Isolation device 150 may include connections to a DC power source 101, an electrical energy storage device 126, a power grid 111, and an EV 127, respectively. Circuit node N1 may be connected to a DC bus of the isolation device 150. An electrical energy storage device 126 may be connected to the DC bus to the isolation device 150, such as to circuit node N1 using switch S61. Electrical energy storage device 126 may be connected to the DC bus using DC/DC power converter 124. Power grid 111 may be connected to an electrical panel 113, such as a distribution board, a distribution panel, or a circuit breaker panel. Power grid 111 may be connected to circuit node N4 of isolation device 150, such as using switch S62. EV 127 may include electrical energy storage device 109, a charger 108, and an onboard isolation component 123. EV 127 may include terminals E1 and/or E2 configured to connect to DC/DC converter 104 and/or AC/DC converter 105 of isolation device 150.

DC/DC power converter 104 may be connected between circuit node N1 and terminal E1. A DC/AC converter 102 may be connected between circuit nodes N1 and N4. Isolation component 123 may be a switchable isolation component, such as a single-input single-output isolation component where the input may be switched between accepting input from terminals T1 or T2. Isolation component 123 may comprise a dual-input single-output isolation component that may transfer power simultaneously from nodes N2 and N3 to charger 108. Switches S61, S62, S63, and S64 may be implemented with electromechanical relays.

EV 127 may include switches S63 and S64 to connect terminals E1 and E2 to charger 108 when isolation is not advantageous. EV 127 may include a microcontroller unit (MCU) 194 to control operation of isolation component 123 and switches S63 and S64. Isolation component 123 may include terminals T1, T2, and T3 for connecting to EV terminals E1 and E2, and charger 108.

Isolation device 150 may include controller 164 to control the operation of switches (e.g., S61, S62, S63, and S64), isolation component 123, and converters (e.g., 102 and 104). Controller 154 may be incorporated in isolation device 150, in EV 127, MCU 194, or in another device in communication with isolation device 150 and EV 107, and configured to control the operation of the switches (e.g., S61, S62, S63, and S64), isolation component 123, and converters (e.g., 102, 104, 105, and 126).

For example, the following TABLE 4 shows the allowed configuration of switches for different power supply scenarios of FIG. 1F. The terms open and closed states of switches mean non-conducting and conducting, respectively.

TABLE 4

Switch configurations for FIG. 1F.

| Configuration | S61 state | S62 state | S63 state | S64 state | Scenario |
|---|---|---|---|---|---|
| 1 | Closed* | Closed | Open | Open | Isolated |
| 2 | Closed* | Open | Closed | Closed | Not isolated |

*based on requirements

For example, configuration 1 may be used when the DC power source 101 is producing more power than needed by EV 127 charging, and the DC power is used for EV 127 charging and to feed the excess power to the power grid 111. For example, configuration 2 may be used to supply power from the DC power source 101 without using the isolation component 123. An additional switch (not shown) may be located between DC/AC converter 102 and circuit node N4 and the additional switch may be opened and switch S62 closed to isolate only the AC bus from the EV 127 and the DC power side is connected without using the isolation component 123 (switch S63 closed).

Figure 1G:
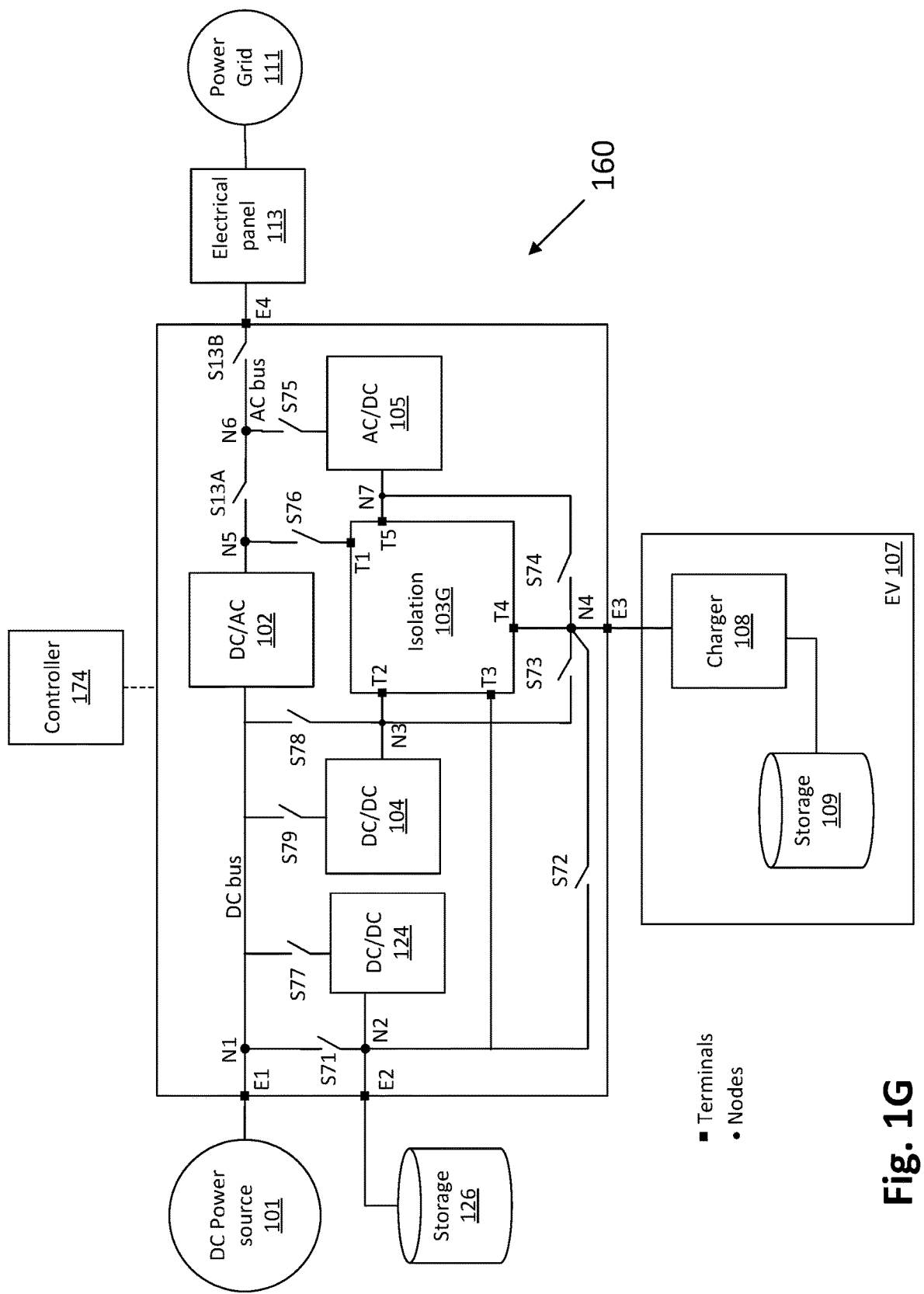
FIG. 1G shows a block-diagram depicting an isolation device associated with multiple AC and multiple DC inputs.

Reference is now made to FIG. 1G, which shows a block-diagram depicting isolation device 160 from multiple AC and multiple DC inputs. Isolation device 160 may include terminals E1, E2, E3, and E4 configured to connect to a DC power source 101, electrical energy storage device 126, an EV 107, and a power grid 111, respectively. Terminal E1 may be connected to a DC bus of the isolation device 160, such as at circuit node N1. An electrical energy storage device 126 may be connected to the DC bus within the isolation device 120, such as by using a switch S71 between circuit node N1 and circuit node N2. Electrical energy storage device 126 may be connected to the DC bus using DC/DC power converter 124 in series with switch S77. Power grid 111 may be connected to an electrical panel 113, such as a distribution board, a distribution panel, or a circuit breaker panel. Electrical panel 113 may be connected to terminal E4 of isolation device 160. EV 107 may include electrical energy storage device 109 and a charger 108. EV 107 may be connected to terminal E3 of isolation device 160.

A DC/DC power converter 104 may be connected in series with switch S79 between circuit node N1 and circuit node N3. DC/DC power converter 124 may be connected between circuit node N1 and circuit node N3 in series with switch S77 and in parallel to switch S71. When DC/DC power converter 124 is not advantageous, such as when the voltage on terminal E1 is the same as the voltage on terminal E2, switch S71 may be closed and DC/DC power converter 124 may be disabled or switch S77 opened. When the voltage across terminal E1 is different from the voltage across terminal E2, switch S71 may be opened, switch S75 closed, and DC/DC power converter 124 may be enabled to convert between the two voltages using buck mode or boost mode voltage conversion circuits as may be advantageous. Circuit node N5 and circuit node N6 may be connected to an AC bus and to terminal E4 using switches S13A and switch S13B. A DC/AC converter 102 may be connected in series with switch S13A between circuit node N1 and circuit node N5. AC/DC converter 105 may be connected in series with switch S77 between circuit node N6 and circuit node N7. An isolation component 103G may be connected between power source circuit nodes N1, N2, N3, N5, and N7 and load circuit node N4 using the terminals of isolation component 103G T1, T2, T3, T4, and T5. Switch S73 may be used to connect the output of DC/DC converter 104 at circuit node N3 to circuit node N4 when isolation is not advantageous for this current path.

Isolation component 103G may be a switchable isolation component, such as a single-input single-output isolation component where the input may be switched between accepting AC or DC input from circuit nodes N2, N3, N5, or N7 as described in detailed aspects hereinbelow. Isolation component 103G may comprise a dual-input single-output isolation component that may accept power simultaneously from DC/DC converter 104 using circuit node N3 and from AC/DC converter 105 using circuit node N7. Isolation component 103G may comprise a triple-input single-output isolation component that may accept power simultaneously from DC/DC converter 104 using circuit node N3, from AC/DC converter 105 using circuit node N7, and from circuit nodes N2 or N5. Isolation component 103G may comprise a quad-input single-output isolation component that may accept power simultaneously from DC/DC converter 104 using circuit node N3, from AC/DC converter 105 using circuit node N7, from circuit node N2, and from circuit node N5 (AC power).

Switch S74 may be used to connect the output of AC/DC converter 105 at circuit node N7 to circuit node N4 when isolation is not advantageous for this current path. When DC bus (circuit node N1) is not connected to power grid 111, such as when switch S13A or switch S13B are open, switch S73 may be closed to connect the output of DC/DC converter 104 to the EV 107. When switch S13A is closed and switch S13B is open, switches S73, S74, S75 and S79 may be closed to connect the outputs of DC/DC converter 104 and AC/DC converter 105 to node N4, thereby not using the isolation component 103G when not advantageous. Switches S13A, S13B, S71, S72, S73, S74, S75, S76, S77, S78, and S79 may be implemented with electromechanical relays to provide isolation when open.

Isolation device 160 may include controller 174 to control the operation of switches (e.g., S13A, S13B, S71, S72, S73, S74, S75, S76, S77, S78, and S79), isolation component 103G, and converters (e.g., 102, 124, 104, and 105). Controller 174 may be incorporated in isolation device 160 or in another device in communication with isolation device 160 and configured to control the operation of the switches (e.g., S13A, S13B, S71, S72, S73, S74, S75, S76, S77, S78, and S79), isolation component 103G, and converters (e.g., 102, 124, 104, and 105).

As in TABLE 1 and TABLE 2, the switches of FIG. 1G may be open and closed mutatis mutandis in configurations to include the isolation component 103G between the EV 107 and the power grid 111.

Figure 1H:
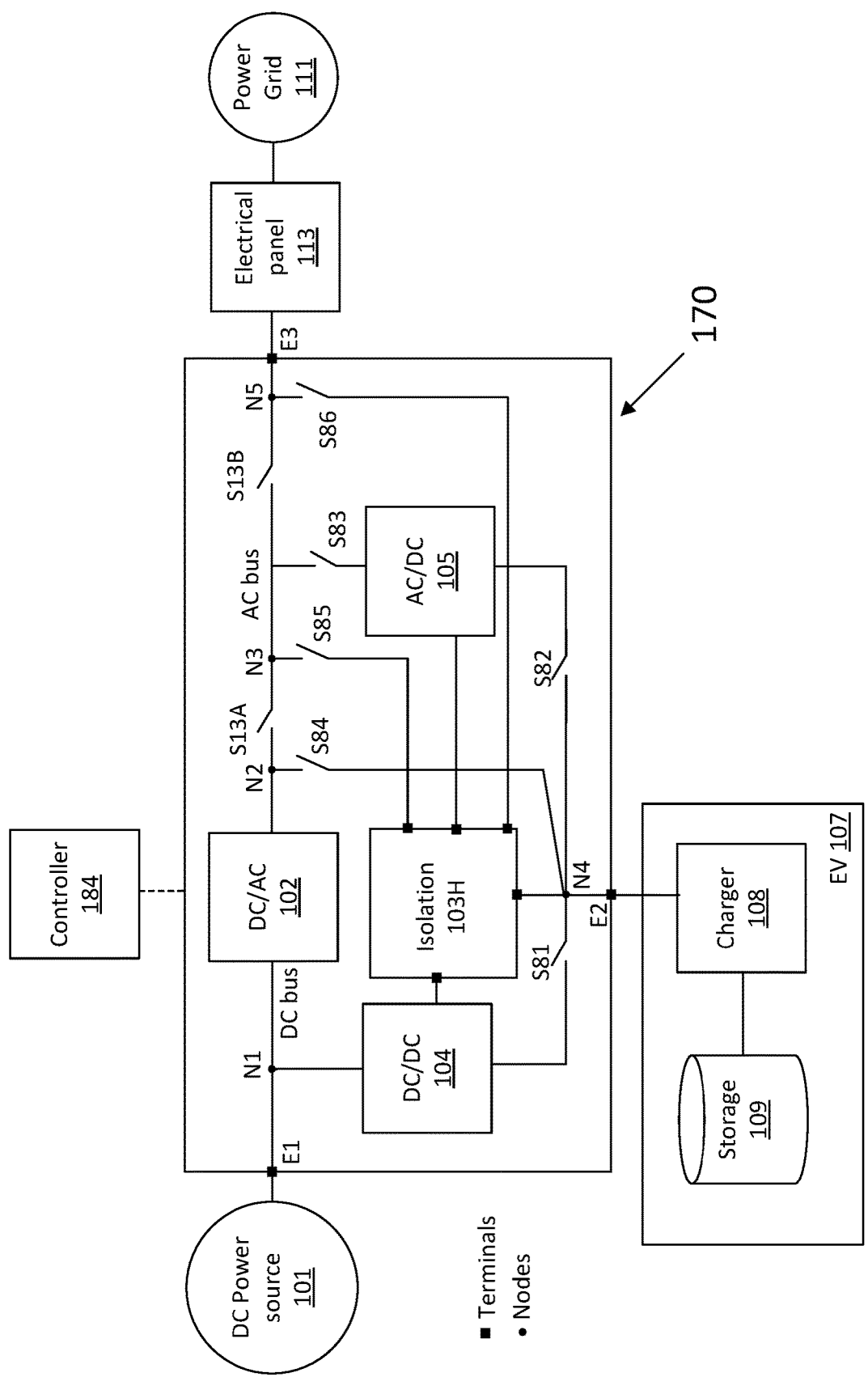
FIG. 1H shows a block-diagram depicting an isolation device associated with multiple AC input aspects.

Reference is now made to FIG. 1H, which shows a block-diagram depicting isolation device 170 associated with multiple AC and DC inputs. Isolation device 170 may include terminals E1, E2, and E3 configured to connect to a DC power source 101, an EV 107, and a power grid 111, respectively. Terminal E1 may be connected to a DC bus of the isolation device 170, such as at circuit node N1. Power grid 111 may be connected to an electrical panel 113, such as a distribution board, a distribution panel, or a circuit breaker panel. Electrical panel 113 may be connected to terminal E3 of isolation device 170. EV 107 may include electrical energy storage device 109 and a charger 108. EV 107 may be connected to terminal E2 of isolation device 170.

A DC/DC power converter 104 may be connected between circuit node N1 and circuit node N4. Circuit nodes N2, N3, and N5 may be connected to an AC bus and to terminal E3 using switches S13A and S13B. A DC/AC converter 102 may be connected between circuit node N1 and circuit node N2. AC/DC converter 105 may be connected in series with switch S83 between circuit node N3 and isolation component 103H. Switch S81 may be used to connect the output of DC/DC converter 104 to circuit node N4 when isolation is not advantageous for this current path. Isolation component 103H may be a switchable isolation component, such as a single-input single-output isolation component where the input may be switched between accepting AC or DC input from converters 104 or 105, or circuit nodes N2, N3, or N5 as described in detailed aspects hereinbelow. Isolation component 103H may comprise a dual-input single-output isolation component that may accept power simultaneously from converters 104 or 105 and from circuit nodes N2, N3, or N5. Isolation component 103H may comprise a triple-input single-output isolation component that may accept power simultaneously from DC/DC converter 104, from AC/DC converter 105, and from circuit nodes N2, N3, or N5. Isolation component 103H may comprise a quad-input single-output isolation component that may accept power simultaneously from DC/DC converter 104, from AC/DC converter 105, and form two of circuit nodes N2, N3, or N5 (AC power). Isolation component 103H may comprise a five-input single-output isolation component that may accept power simultaneously from DC/DC converter 104, from AC/DC converter 105, and form two of circuit nodes N2, N3, and N5 (AC power).

Switch S82 may be used to connect the output of AC/DC converter 105 to circuit node N4 when isolation is not advantageous for this current path. When DC bus (circuit node N1) is not connected to power grid 111, such as when switch S13A or switch S13B are open, switch S81 may be closed to connect the output of DC/DC converter 104 to circuit node N4. When switch S13A is closed and switch S13B is open, switches S81, S82, and S83 may be closed to connect the outputs of DC/DC converter 104 and AC/DC converter 105 to node N4, thereby not using the isolation component 103H when not advantageous. When switch S13A or switch S13B is open, switches S81 and S84 may be closed to connect the outputs of DC/DC converter 104 and DC/AC converter 102 to node N4, thereby not using the isolation component 103H when not advantageous. Further to this scenario, when switch S13A is open and switch S13B is closed, switches S83, S85, and S86 may be closed and isolation component 103H may receive power from the AC/DC power converter 105 and power grid 111. For example, when the isolation component 103H has available DC power isolation capacity and available AC power isolation capacity, and receipt of power from the power grid 111 connected devices may utilize both of these availabilities. Switches S13A, S13B, S81, S82, S83, S84, S85, and S86 may be implemented with electromechanical relays to provide isolation when open.

Isolation device 170 may include controller 184 to control the operation of switches (e.g., S13A, S13B, S81, S82, S83, S84, S85, and S86), isolation component 103H, and converters (e.g., 102, 104, and 105). Controller 184 may be incorporated in isolation device 170 or in another device in communication with isolation device 170 and configured to control the operation of the switches (e.g., S13A, S13B, S81, S82, S83, S84, S85, and S86), isolation component 103H, and converters (e.g., 102, 104, and 105).

As in TABLE 1 and TABLE 2, the switches of FIG. 1H may be open and closed mutatis mutandis in configurations to include the isolation component 103H between the EV 107 and the power grid 111. Additionally, switch S84 may be closed to supply AC power from the DC/AC converter 102 directly to the EV 107.

Example isolation components may be configured for other combinations of power transfer, number and types of sources, number and types of loads. For example, a golf sport center may have multiple electrical golf carts that need to be charged simultaneously, and the examples of FIGS. 1A though 1H may include multiple EVs instead of the single example EV. It is understood that the isolation of the power from the grid is independent of the number and types of EVs, and the total power of the system (peak and average) is controlled for a particularly configured technical solution. The aspects of the technical solutions may be organized differently but the particularly configured solutions may comprise at least some aspects of the technical solutions disclosed herein.

Figure 2A:
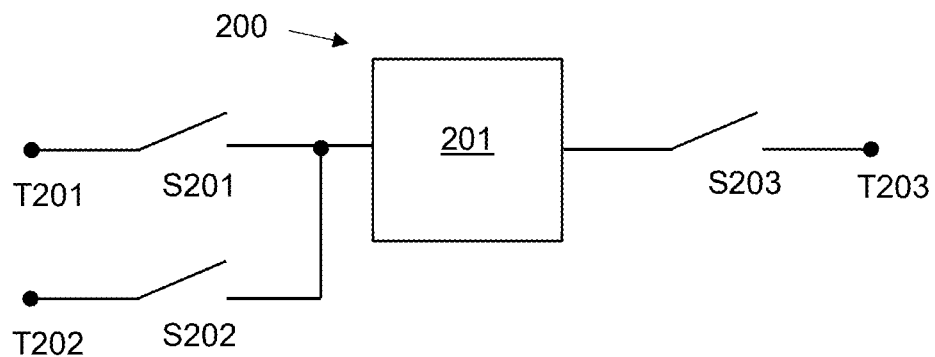
FIG. 2A shows a block-diagram depicting a switchable isolation transformer between two sources and a load.

Reference is now made to FIG. 2A, which shows a block-diagram depicting a switchable isolation transformer 200 between two sources and a load. Switchable isolation transformer 200 includes a single-source single-load isolation transformer 201, and switches S201, S202, and S203, between the single-source single-load isolation transformer 201 and terminals T201, T202, and T203 of the switchable isolation transformer 200. Switches S201 and S202 may be alternately closed to enable power transfer from one of the two terminals T201 and T202. Switches S201 and S202 may be closed simultaneously to enable power transfer from both of terminals T201 and T202 simultaneously.

Figure 2B:
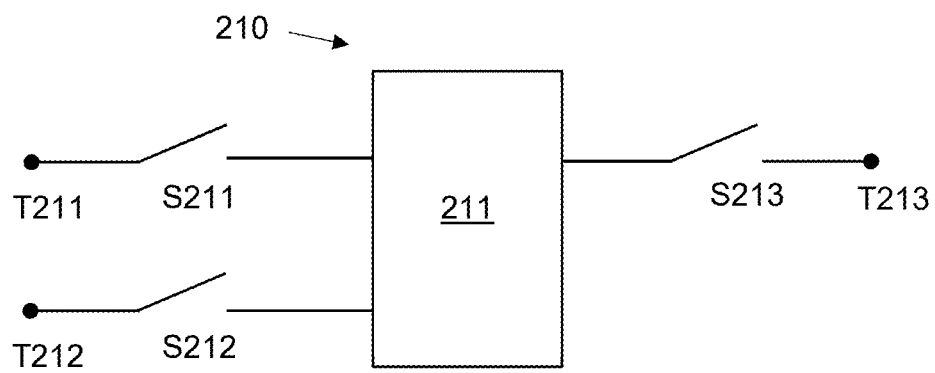
FIG. 2B shows a block-diagram depicting a switchable isolation transformer between a combined two sources and a load.

Reference is now made to FIG. 2B, which shows a block-diagram depicting a switchable isolation transformer 210 between a combined two sources and a load. Switchable isolation transformer 210 includes a single-source single-load isolation transformer 211, and switches S211, S212, and S213, between the dual-source single-load isolation transformer 211 and terminals T211, T212, and T213 of the switchable isolation transformer 210. Dual-source single-load isolation transformer 211 may comprise two primary coils (as may be described below), one each for transferring power from terminals T211 and T212. Switches S211 and S212 may be alternately closed to enable power transfer from one of the two terminals T211 and T212. This example may have drawbacks due to feedback from the unused primary coil, and the transformer 211 may comprise solutions that manage this feedback. Switches S211 and S212 may be closed simultaneously to enable power transfer from both of terminals T211 and T212 simultaneously.

Figure 2C:
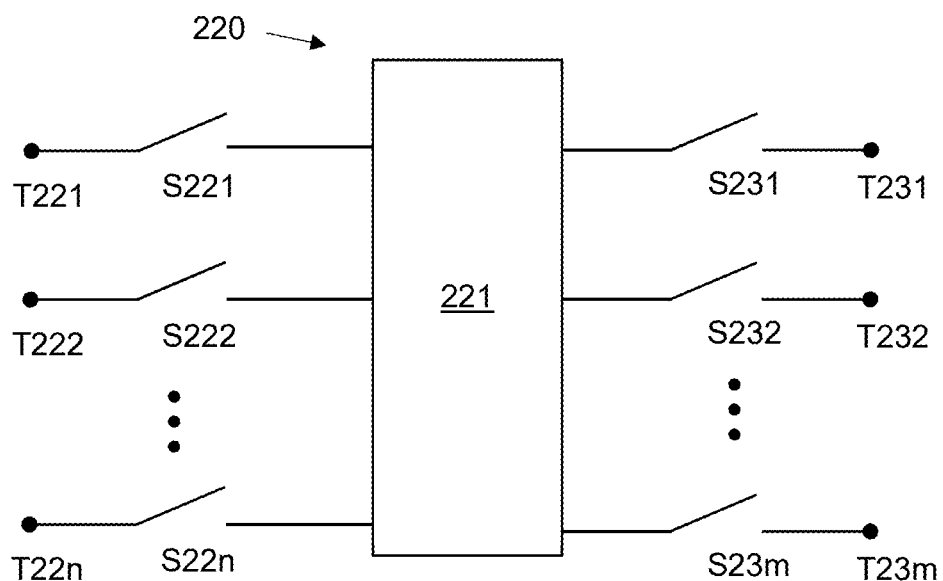
FIG. 2C shows a block-diagram depicting a switchable isolation transformer between a combined three sources and a load.

Reference is now made to FIG. 2C, which shows a block-diagram depicting a switchable isolation transformer 220 between n sources and m loads. Switchable isolation transformer 221 includes an n-source m-load isolation transformer 220. Switchable isolation transformer 220 includes switches S221, S222, through S22n, between the n-source m-load isolation transformer 221 on the source side and terminals T221, T222, through T22n of the switchable isolation transformer 200. Switchable isolation transformer 220 includes switches S231, S232, through S23m, between the n-source m-load isolation transformer 221 on the source side and terminals T231, T232, through T23m of the switchable isolation transformer 220.

N-source m-load isolation transformer 221 may comprise n primary coils (as shown hereinbelow), one each for transferring power from terminals T221 through T22n. N-source m-load isolation transformer 221 may comprise m secondary coils (as shown hereinbelow), one each for transferring power from terminals T231 through T23m. Switches S221 through S22n may be alternately closed to enable power transfer from one of the two terminals T221 through T22n. Switches S231 through S23m may be alternately closed to enable power transfer from one of the two terminals T231 through T23m. This example may have drawbacks due to feedback from the unused primary or secondary coils, and the transformer 221 may comprise solutions that manage this feedback. Some of switches S221 through S22n may be closed simultaneously to enable power transfer from respective terminals T221 through T22n simultaneously. Some of switches S231 through S23m may be closed simultaneously to enable power transfer from respective terminals T231 through T23m simultaneously. All of switches S221 through S22n may be closed simultaneously to enable power transfer from respective terminals T221 through T22n simultaneously. All of switches S231 through S23m may be closed simultaneously to enable power transfer from respective terminals T231 through T23m simultaneously.

Figure 2D:
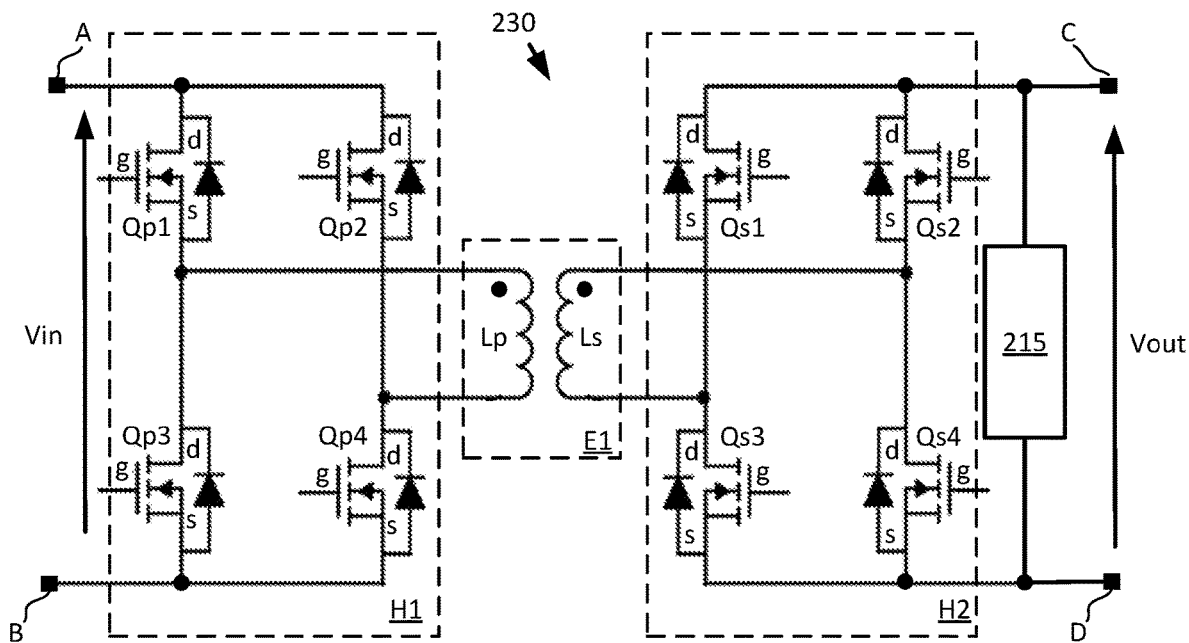
FIG. 2D shows a circuit-diagram depicting a switchable isolation transformer between a source and a load.

Reference is now made to FIG. 2D, which shows a circuit-diagram depicting a switchable isolation transformer 230 between a source Vin and a load Vout. Isolation transformer 230 may include a DC-DC transformer E1 and H-bridges H1 and H2. H-bridge H1 may include switches Qp1, Qp2, Qp3, and Qp4 that may operate to convert the input voltage Vin (on input terminals A and B) to a high frequency dual stage PWM output, that may be used to drive the primary coil Lp of transformer E1. H-bridge H2 may include switches Qs1, Qs2, Qs3, and Qs4 that may operate to convert the voltage on the secondary coil Ls of transformer E1 to an output voltage Vout (on input terminals C and D). A capacitor 215 may be used on across the output voltage Vout to stabilize and regulate this as a DC voltage output. Since the H-bridges H1 and H2 are symmetrical, the transformer may operate bidirectionally. Each switch of Qp1, Qp2, Qp3, Qp4, Qs1, Qs2, Qs3, and Qs4 may be a field-effect transistor (FET) and include a gate terminal g, a source terminal s, and a drain terminal d.

Figure 2E:
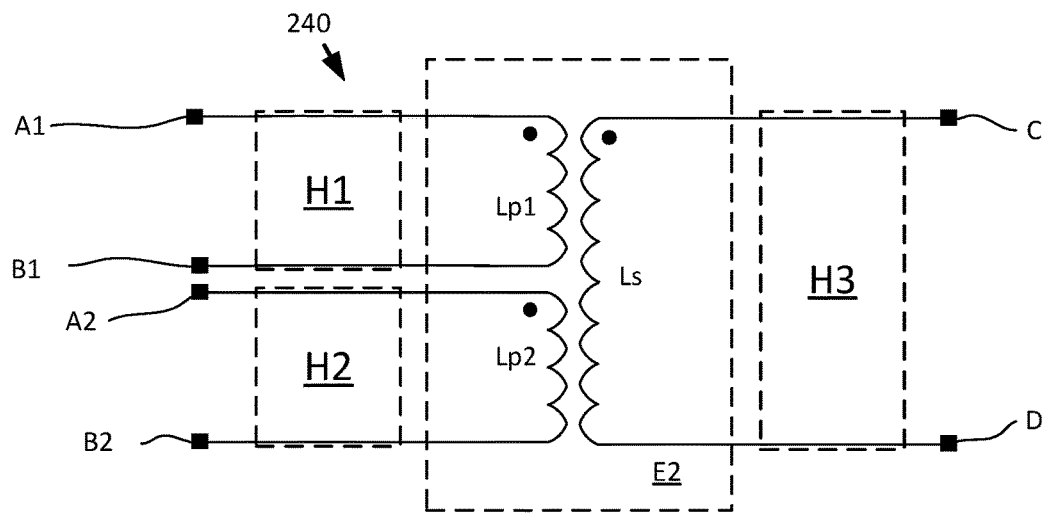
FIG. 2E shows a schematic circuit-diagram depicting a switchable isolation transformer with primary windings for two sources.

Reference is now made to FIG. 2E, which shows a schematic circuit-diagram depicting a switchable isolation transformer 240 with primary windings Lp1 and Lp2 for two sources. Isolation transformer 240 may include a DC-DC transformer E2 and H-bridges H1, H2, and H3, where each H-bridge may include switches as in FIG. 2D (FETs). H-bridges H1 and H2 may each operate to convert the input voltages on input terminals A1, B1, A2, and B2 to a high frequency dual stage PWM output, that may be used to drive the primary coils Lp1 and Lp2 of transformer E2. H-bridge H3 may operate to convert the voltage on the secondary coil Ls of transformer E2 to an output voltage on input terminals C and D. A capacitor may be used across the output voltage to stabilize and regulate this as a DC voltage output. Since the H-bridges H1, H2, and H3 are symmetrical, the transformer may operate bidirectionally.

Figure 2F:
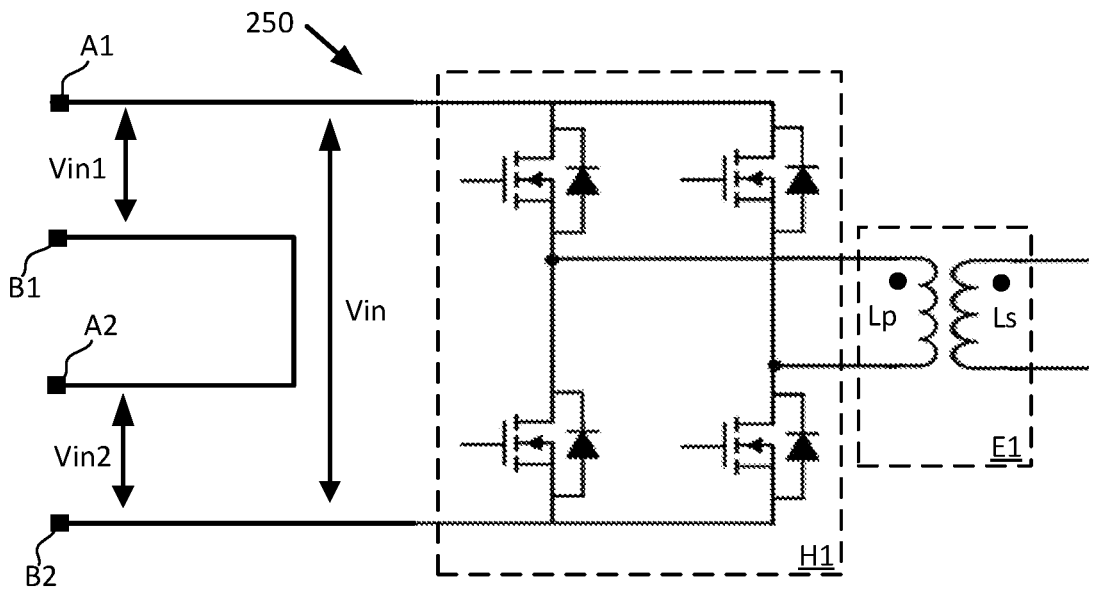
FIG. 2F shows a circuit-diagram depicting a switchable isolation transformer with two sources in series.

Reference is now made to FIG. 2F, which shows a circuit-diagram depicting a switchable isolation transformer 250 with two sources connected in series. Isolation transformer 250 may be similar to isolation transformer 230 of FIG. 2D, but the input to the H-bridge H1 may be from two power sources in series with voltages Vin1 on terminals A1 and B1 and Vin2 on terminals A2 and B2. Together these voltages are combined in series to produce Vin which may be the source of power for H-bridge H1 and transformer E1. Transformer E1 may be as in FIG. 2D with primary Lp and secondary Ls windings.

Figure 2G:
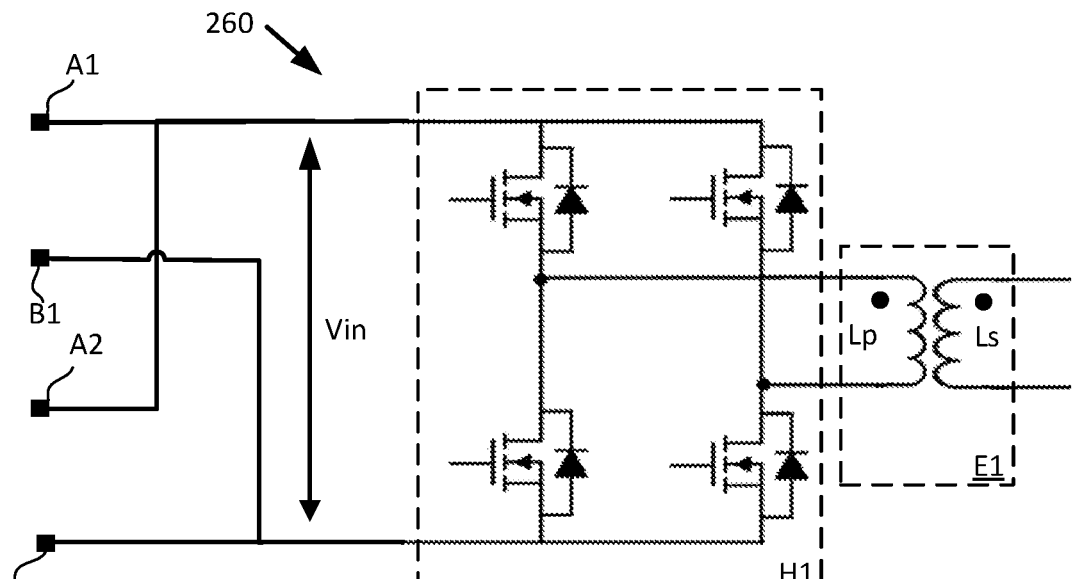
FIG. 2G shows a circuit-diagram depicting a switchable isolation transformer with two sources in parallel.

Reference is now made to FIG. 2G, which shows a circuit-diagram depicting a switchable isolation transformer 260 with two sources in parallel. Isolation transformer 260 may be similar to isolation transformer 230 of FIG. 2D, but the input to the H-bridge H1 may be from two power sources in parallel with voltage Vin on terminals A1 and B1 and on terminals A2 and B2. Together these inputs are combined in parallel to produce Vin (with current being combined from both sources). The combined current and voltage may be the source of power for H-bridge H1 and transformer E1. Transformer E1 may be as in FIG. 2D with primary Lp and secondary Ls windings.

Figure 2H:
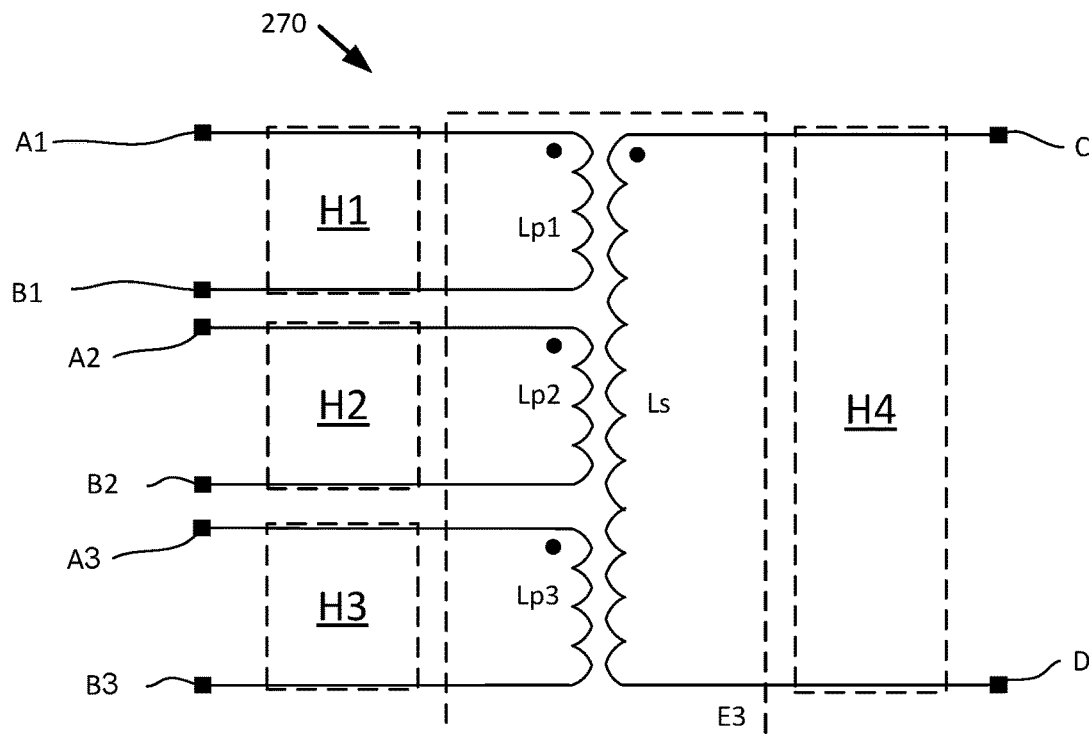
FIG. 2H shows a schematic circuit-diagram depicting a switchable isolation transformer with primary windings for three sources.

Reference is now made to FIG. 2H, which shows a schematic circuit-diagram depicting a switchable isolation transformer 270 with primary windings for three sources. Isolation transformer 270 may include a DC-DC transformer E3 and H-bridges H1, H2, H3, and H4, where each H-bridge may include switches as in FIG. 2D (FETs). H-bridges H1, H2, and H3 may each operate to convert the input voltages on input terminals A1, B1, A2, B2, A3, and B3 to high frequency dual stage PWM output, that may be used to drive the primary coils Lp1, Lp2, and Lp3 of transformer E3. H-bridge H4 may operate to convert the voltage on the secondary coil Ls of transformer E3 to an output voltage on input terminals C and D. A capacitor may be used across the output voltage to stabilize and regulate this as a DC voltage output. Since the H-bridges H1, H2, H3, and H4 are symmetrical, the transformer may operate bidirectionally.

Figure 2I:
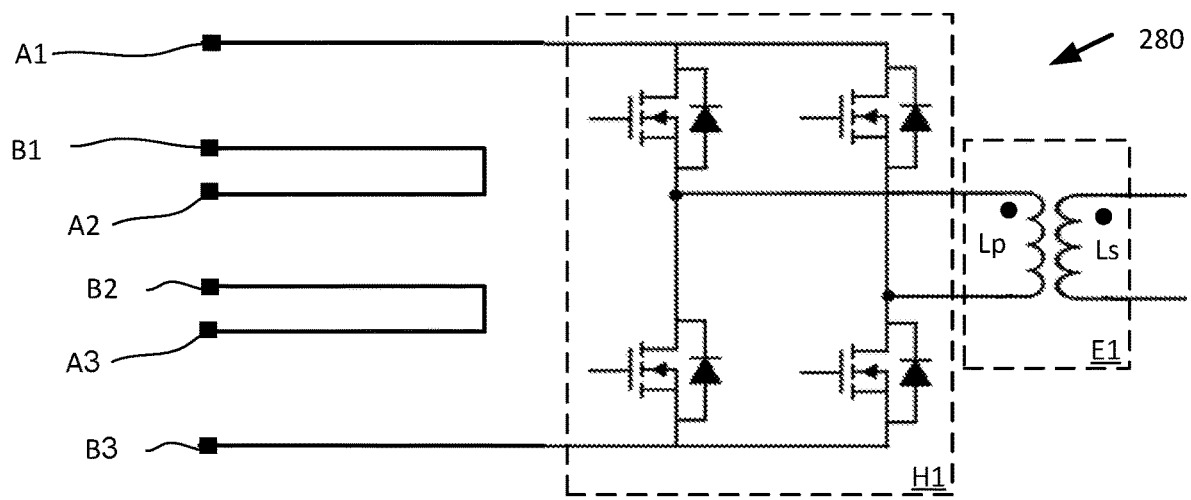
FIG. 2I shows a circuit-diagram depicting a switchable isolation transformer with three sources in series.

Reference is now made to FIG. 2I, which shows a circuit-diagram depicting a switchable isolation transformer 280 with three sources in series. Isolation transformer 280 may be similar to isolation transformer 230 of FIG. 2D, but the input to the H-bridge H1 may be from three power sources in series with voltages on terminals Al and B1, on terminals A2 and B2, and on terminals A3 and B3. Together these voltages are combined in series to produce Vin which may be the source of power for H-bridge H1 and transformer E1. Transformer E1 may be as in FIG. 2D with primary Lp and secondary Ls windings.

Figure 2J:
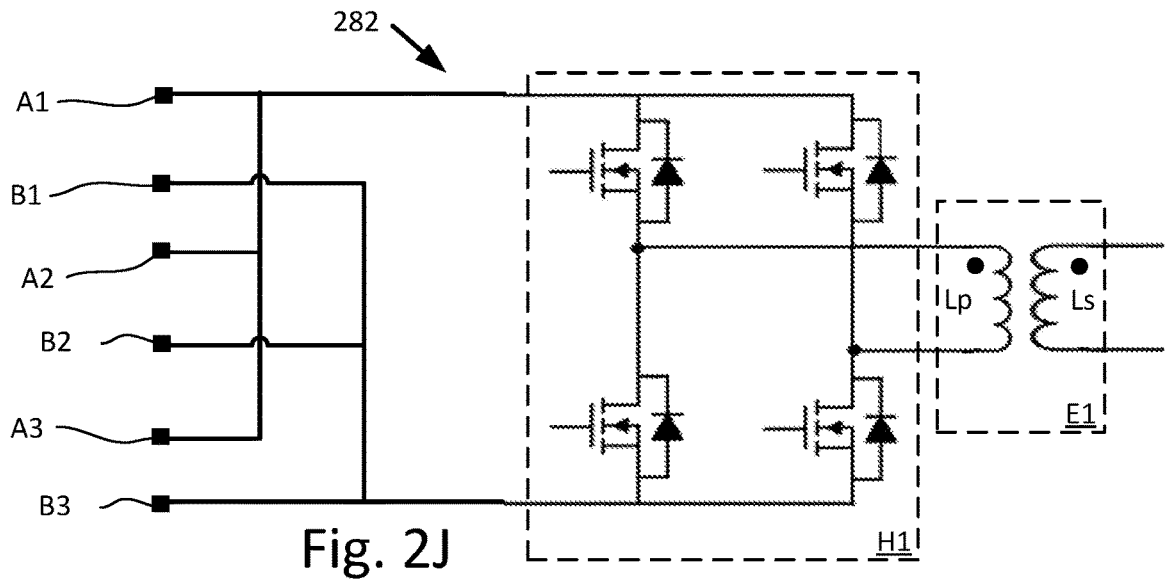
FIG. 2J shows a circuit-diagram depicting a switchable isolation transformer with three sources in parallel.

Reference is now made to FIG. 2J, which shows a circuit-diagram depicting a switchable isolation transformer 282 with three sources in parallel. Isolation transformer 282 may be similar to isolation transformer 230 of FIG. 2D, but the input to the H-bridge H1 may be from three power sources in parallel on terminals A1 and B1, on terminals A2 and B2, and on terminals A3 and B3. Together these inputs are combined in parallel to produce Vin (with current being combined from three sources). The combined current and voltage Vin may be the source of power for H-bridge H1 and transformer E1. Transformer E1 may be as in FIG. 2D with primary Lp and secondary Ls windings.

Figure 2K:
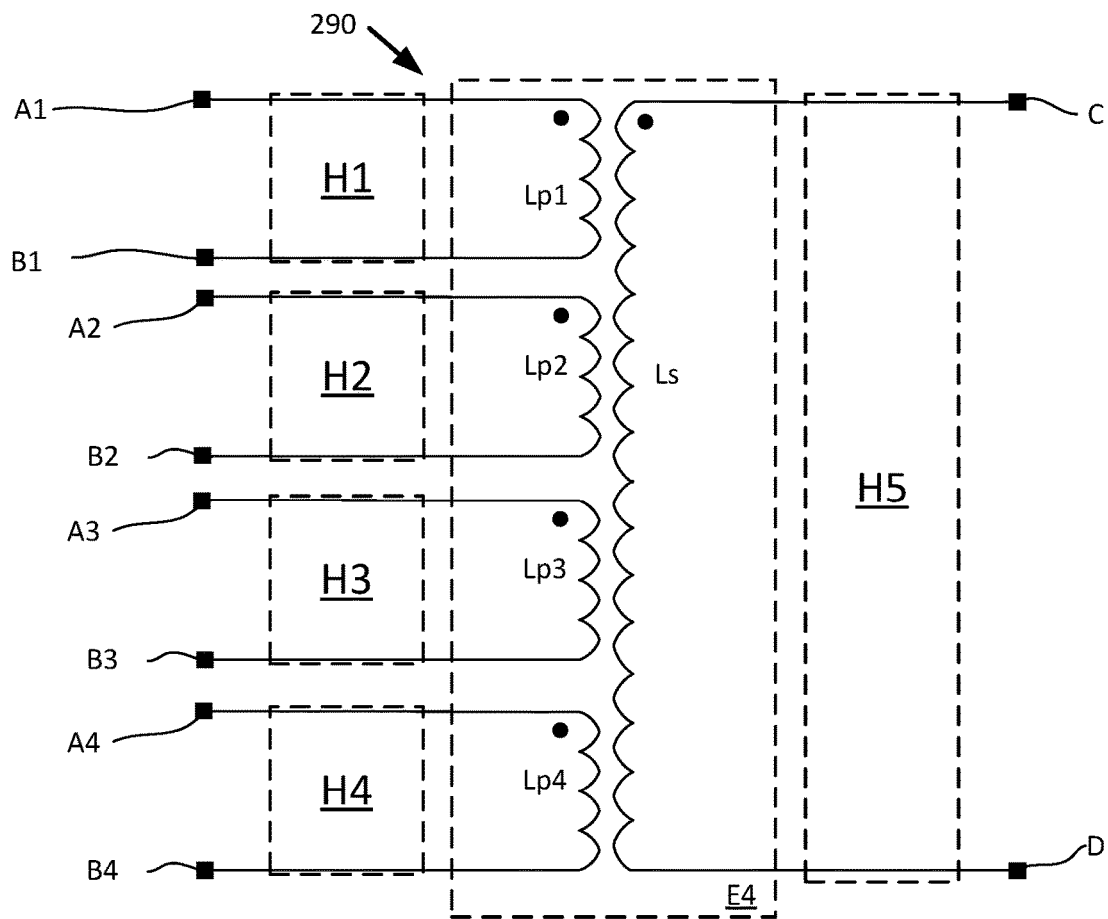
FIG. 2K shows a schematic circuit-diagram depicting a switchable isolation transformer with primary windings for four sources.

Reference is now made to FIG. 2K, which shows a schematic circuit-diagram depicting a switchable isolation transformer 290 with primary windings for four sources. Isolation transformer 290 may include a DC-DC transformer E4 and H-bridges H1, H2, H3, H4, and H5 where each H-bridge may include switches as in FIG. 2D (FETs). H-bridges H1, H2, H3, and H4 may each operate to convert the input voltages on input terminals A1, B1, A2, B2, A3, B3, A4, and B4 to high frequency dual stage PWM output, that may be used to drive the primary coils Lp1, Lp2, Lp3, and Lp4 of transformer E4. H-bridge H5 may operate to convert the voltage on the secondary coil Ls of transformer E4 to an output voltage on input terminals C and D. A capacitor may be used across the output voltage to stabilize and regulate this as a DC voltage output. Since the H-bridges H1, H2, H3, H4, and H5 are symmetrical, the transformer may operate bidirectionally.

Figure 2L:
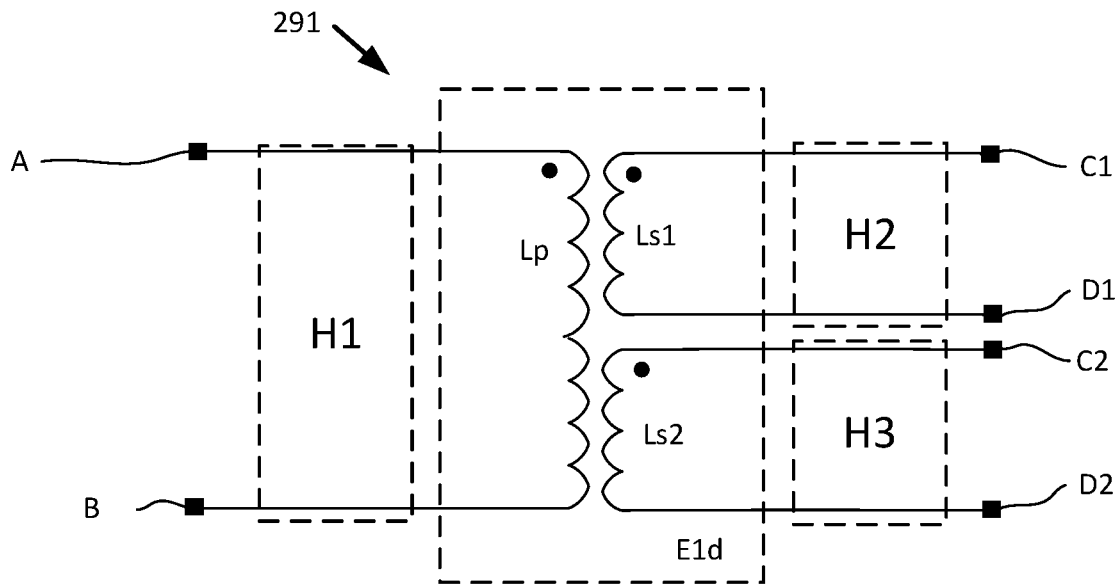
FIG. 2L shows a schematic circuit-diagram depicting a switchable isolation transformer with secondary windings for two loads.

Reference is now made to FIG. 2L, which shows a schematic circuit-diagram depicting a switchable isolation transformer 291 with secondary windings Ls1 and Ls2 for two loads. Isolation transformer 291 may include a DC-DC transformer E1d and H-bridges H1, H2, and H3, where each H-bridge may include switches as in FIG. 2D (FETs). H-bridge H1 may operate to convert the input voltage on input terminals A and B to a high frequency alternating PWM output, that may be used to drive the primary coil Lp of transformer E1d. H-bridges H2 and H3 may operate to convert the voltage on the secondary coils Ls1 and Ls2 of transformer E1d to output voltages and currents on terminals C1, D1, C2, and D2. Capacitors may be used across the output voltages to stabilize and regulate these as DC voltage outputs. Since the H-bridges H1, H2, and H3 are symmetrical, the transformer may operate bidirectionally.

Figure 2M:
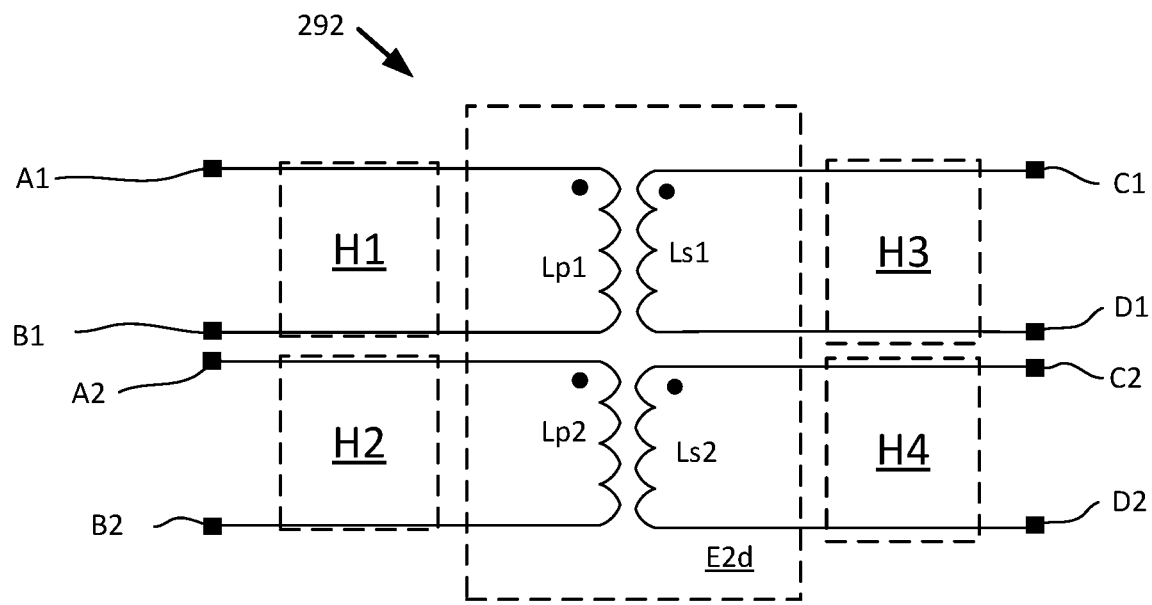
FIG. 2M shows a schematic circuit-diagram depicting a switchable isolation transformer with primary windings for two sources and secondary windings for two loads.

Reference is now made to FIG. 2M, which shows a schematic circuit-diagram depicting a switchable isolation transformer 292 with primary windings Lp1 and Lp2 for two sources and secondary windings Ls1 and Ls2 for two loads. Isolation transformer 292 may include a DC-DC transformer E2d and H-bridges H1, H2, H3, and H4, where each H-bridge may include switches as in FIG. 2D (FETs). H-bridges H1 and H2 may each operate to convert the input voltages on input terminals A1, B1, A2, and B2 to high frequency alternating PWM outputs, that are used to drive the primary coils Lp1 and Lp2 of transformer E2d. H-bridges H3 and H4 may operate to convert the voltage on the secondary coils Ls1 and Ls2 of transformer E2d to output voltages and currents on terminals C1, D1, C2, and D2. Capacitors may be used across the output voltages to stabilize and regulate these as DC voltage outputs. Since the H-bridges H1, H2, H3, and H4 are symmetrical, the transformer may operate bidirectionally.

Figure 2N:
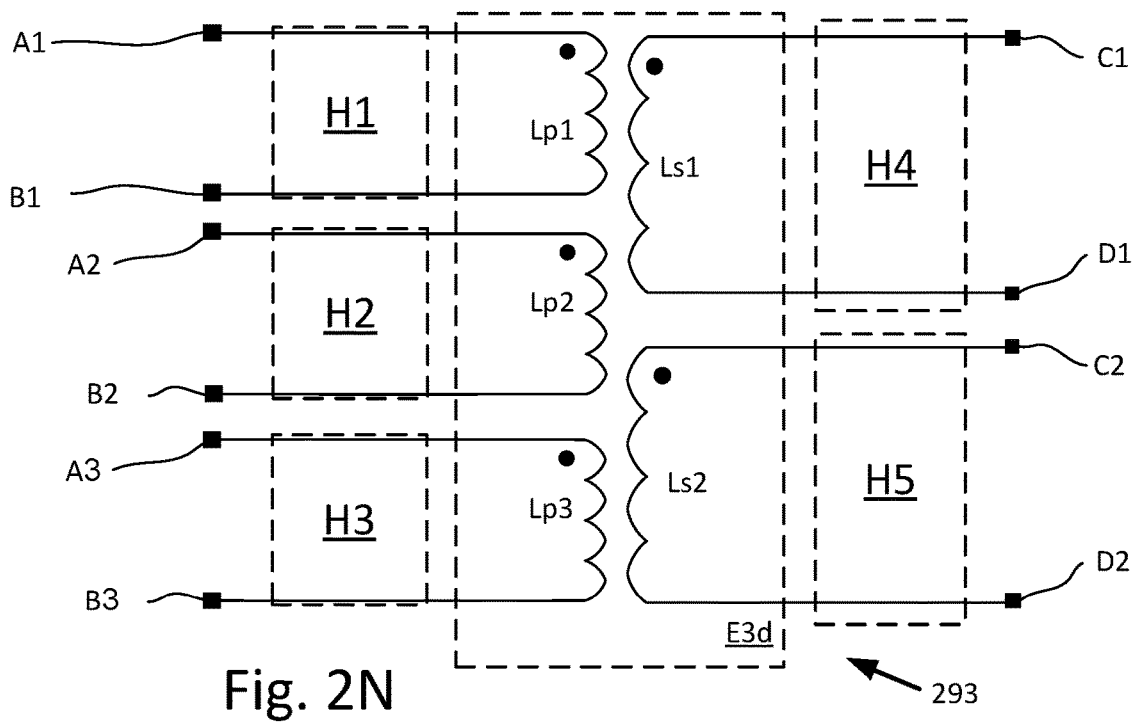
FIG. 2N shows a schematic circuit-diagram depicting a switchable isolation transformer with primary windings for three sources and secondary windings for two loads.

Reference is now made to FIG. 2N, which shows a schematic circuit-diagram depicting a switchable isolation transformer 293 with primary windings Lp1, Lp2, and Lp3 for three sources and secondary windings Ls1 and Ls2 for two loads. Isolation transformer 293 may include a DC-DC transformer E3d and H-bridges H1, H2, H3, H4, and H5, where each H-bridge may include switches as in FIG. 2D (FETs). H-bridges H1, H2, and H3 may each operate to convert the input voltages on input terminals A1, B1, A2, B2, A3, and B3 to high frequency alternating PWM outputs, that are used to drive the primary coils Lp1, Lp2, and Lp3 of transformer E3d. H-bridges H4 and H5 may operate to convert the voltages on the secondary coils Ls1 and Ls2 of transformer E3d to output voltages and currents on terminals C1, D1, C2, and D2. Capacitors may be used across the output voltages to stabilize and regulate these as DC voltage outputs. Since the H-bridges H1, H2, H3, H4, and H5 are symmetrical, the transformer may operate bidirectionally.

Figure 2O:
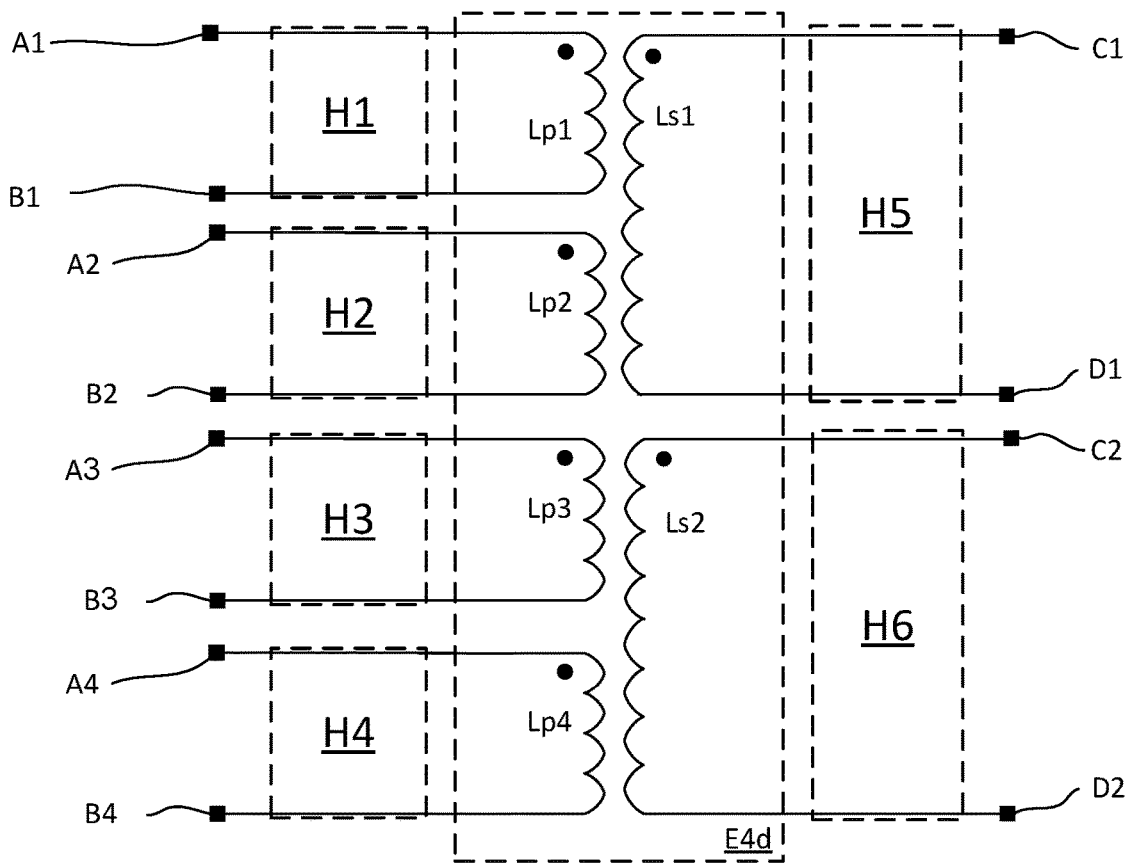
FIG. 2O shows a schematic circuit-diagram depicting a switchable isolation transformer with primary windings for four sources and secondary windings for two loads.

Reference is now made to FIG. 2O, which shows a schematic circuit-diagram depicting a switchable isolation transformer 294 with primary windings Lp1, Lp2, Lp3, and Lp4 for four sources and secondary windings Ls1 and Ls2 for two loads. Isolation transformer 294 may include a DC-DC transformer E4d and H-bridges H1, H2, H3, H4, H5, and H6, where each H-bridge may include switches as in FIG. 2D (FETs). H-bridges H1, H2, H3, and H4 may each operate to convert the input voltages on input terminals A1, B1, A2, B2, A3, B3, A4, and B4 to high frequency alternating PWM outputs, that are used to drive the primary coils Lp1, Lp2, Lp3, and Lp4 of transformer E4d. H-bridges H5 and H6 may operate to convert the voltages on the secondary coils Ls1 and Ls2 of transformer E4d to output voltages and currents on terminals C1, D1, C2, and D2. Capacitors may be used across the output voltages to stabilize and regulate these as DC voltage outputs. Since the H-bridges H1, H2, H3, H4, H5, and H6 are symmetrical, the transformer may operate bidirectionally.

When an isolation trasnformer is used, any of the switches here may be operated by a controller in a makebefore break transition, thus maintianing an electrical conenction. Similary, the BBM transition may be said to maintain a BBM electrical connection.

Figure 3A:
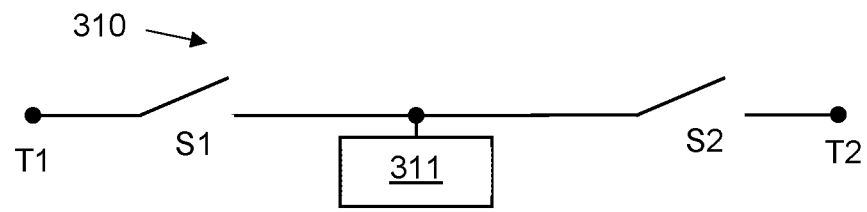
FIG. 3A shows a block-diagram depicting a single-storage device isolation component connected between a single source and single load.

Reference is now made to FIG. 3A, which shows a block-diagram depicting a single-storage device isolation component 310 connected between a single source and single load. Isolation component 310 includes an electrical energy storage device 311, switches S1 and S2 that are connected to respective terminals T1 and T2. Switches S1 and S2 may be electromechanical relays. Switch S2 may be opened, disconnecting the storage device 311 from T2. After switch S2 has been opened, switch S1 may be closed, connecting to TI to the storage device 311, after Switch S1 may be opened, disconnecting the storage device 311 from T1. After switch S1 has opened, switch S2 may be closed, connecting T2 to the storage device 311. In this manner, a BBM connection may be maintained and isolation component 310 may maintain isolation between terminals T1 and T2.

Figure 3B:
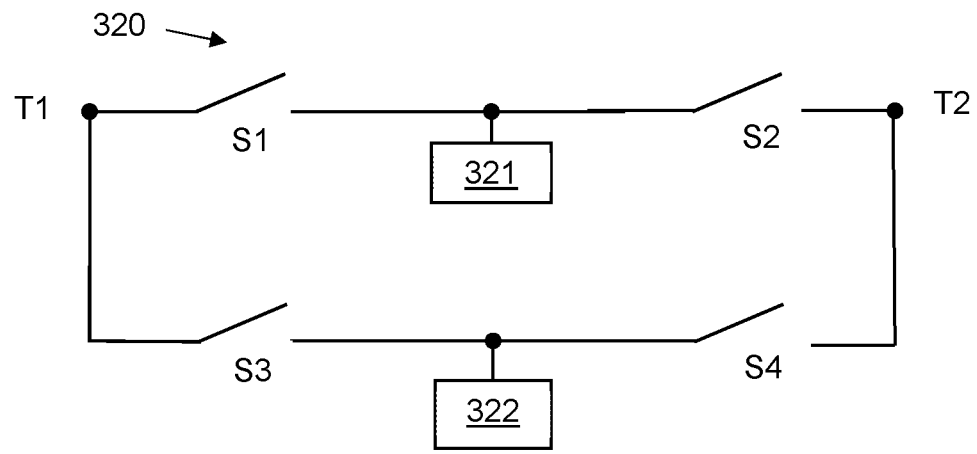
FIG. 3B shows a block-diagram depicting a two-storage device isolation component connected between a single source and single load.

Reference is now made to FIG. 3B, which shows a block-diagram depicting a two-storage device isolation component 320 connected between a single source and single load. Isolation component 310 includes electrical energy storage devices 321 and 322, switches S1 and S2 that are connected to terminal T1, and switches S3 and S4 that are connected to terminal T2. Switches S1, S2, S3, and S4 may be electromechanical relays. Switch S2 may be opened, disconnecting the storage device 321 from T2. After switch S2 has been opened, switch S1 may be closed, connecting T1 to the storage device 321. Switch S1 may be opened, disconnecting the storage device 321 from T1. After switch S1 is opened, switch S2 may be closed, connecting T2 to the storage device 321. Switch S4 may be opened, disconnecting the storage device 322 to T2. After switch S4 has been opened, switch S3 may be closed, connecting to T1 to the storage device 322. Switch S3 may be opened, disconnecting the storage device 322 from T1. After switch S3 has been opened, switch S4 may be closed, connecting T2 to the storage device 322. Thereby the switches may be opened or closed in a BBM transition. Thus, a BBM connection may be maintained and isolation component 320 may maintain isolation between terminals T1 and T2.

Figure 3C:
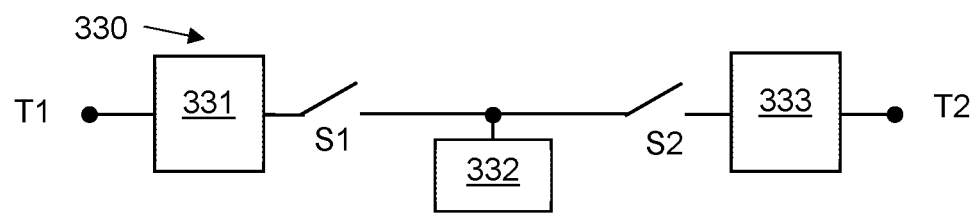
FIG. 3C shows a block-diagram depicting a three-storage device in series isolation component connected between a single source and single load.

Reference is now made to FIG. 3C, which shows a block-diagram depicting a three-storage device in series isolation component 330 connected between a single source and single load. Isolation component 330 may include one or more electrical energy storage devices (e.g., 331, 332, and 333), and switches S1 and S2 that are connected to respective terminals T1 and T2 using storage devices 331 and 332. Switches S1 and S2 may be electromechanical relays. Switch S2 may be opened, disconnecting storage device 332 from storage device 333 and terminal T2. After switch S2 has been opened, switch S1 may be closed, connecting storage device 332 to storage device 331 and terminal T1. Switch S1 may be opened, disconnecting storage device 332 from storage device 331 and terminal T1. After switch S1 has been opened, switch S2 may be closed, connecting storage device 332 to storage device 333 and terminal T2. In this transition, a BBM connection may be maintained and isolation component 330 may maintain isolation between terminals T1 and T2.

Figure 3D:
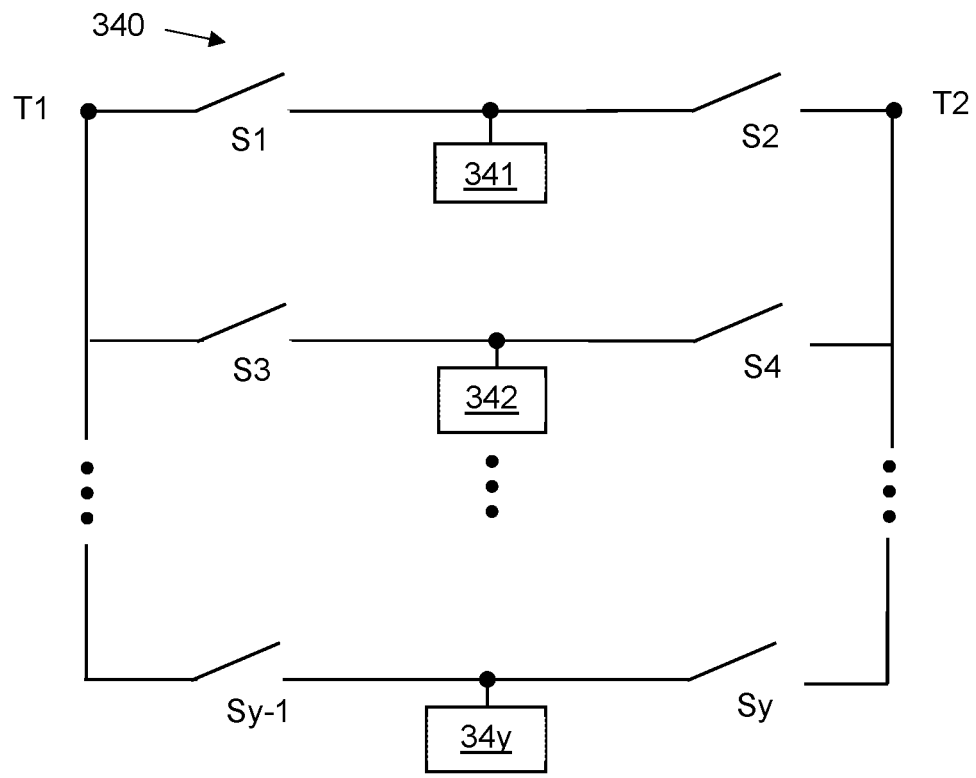
FIG. 3D shows a block-diagram depicting an n-storage device isolation component connected between a single source and single load.

Reference is now made to FIG. 3D, which shows a block-diagram depicting an n-storage device isolation component 340 connected between a single source and single load. Isolation component 340 includes electrical energy storage devices 341, 342, and so on through 34y; switches S1, S3, and so on through Sy-1 that are connected to terminal T1; and switches S2, S4, and so on through Sy that are connected to terminal T2. Switches S1 through Sy may be electromechanical relays.

For each switch-storage-switch set:
  The switch connected to T2 may be opened, and the storage device may be disconnected from T2.
  After the switch connected to T2 has been opened, the switch connected to T1 (S1 through Sy-1) may be closed, connecting T1 to the storage device (341 through 34y).
  The switch connected to T1 may be opened, and the storage device may be disconnected from T1.
  After the switch connected to T1 has been opened, the switch connected to T2 (S2 through Sy) may be closed, connecting to T2 to the storage device (341 through 34y).

Thereby the switches may be opened or closed in a BBM transition. Thus, a BBM connection may be maintained and isolation component 340 may maintain isolation between terminals T1 and T2.

Figure 3E:
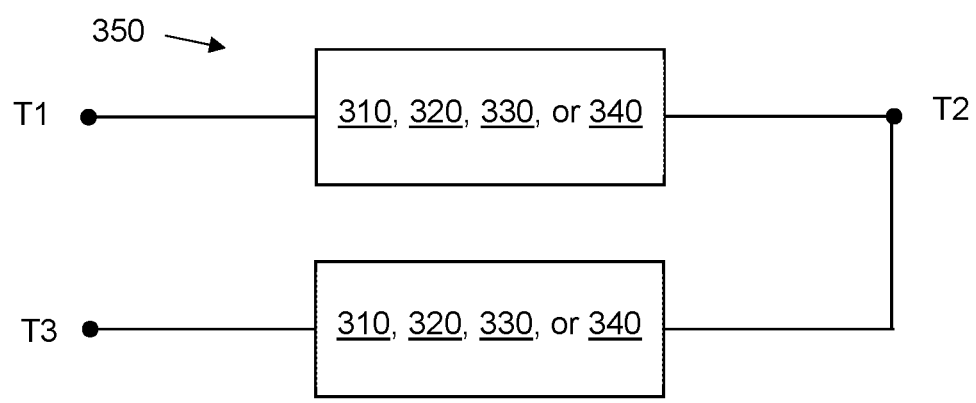
FIG. 3E shows a block-diagram depicting two storage device isolation components connected between two sources and single load.

Reference is now made to FIG. 3E, which shows a block-diagram depicting two-storage device isolation components 350 connected between two sources and a single load. Each of isolation components 350 may comprise one of isolation components 310, 320, 330, or 340, where one side may be connected to one of terminals T1 or T3 and the other connected to terminal T2. The structure and operation of components 310, 320, 330, or 340 may be described in FIGS. 3A through 3D.

Figure 3F:
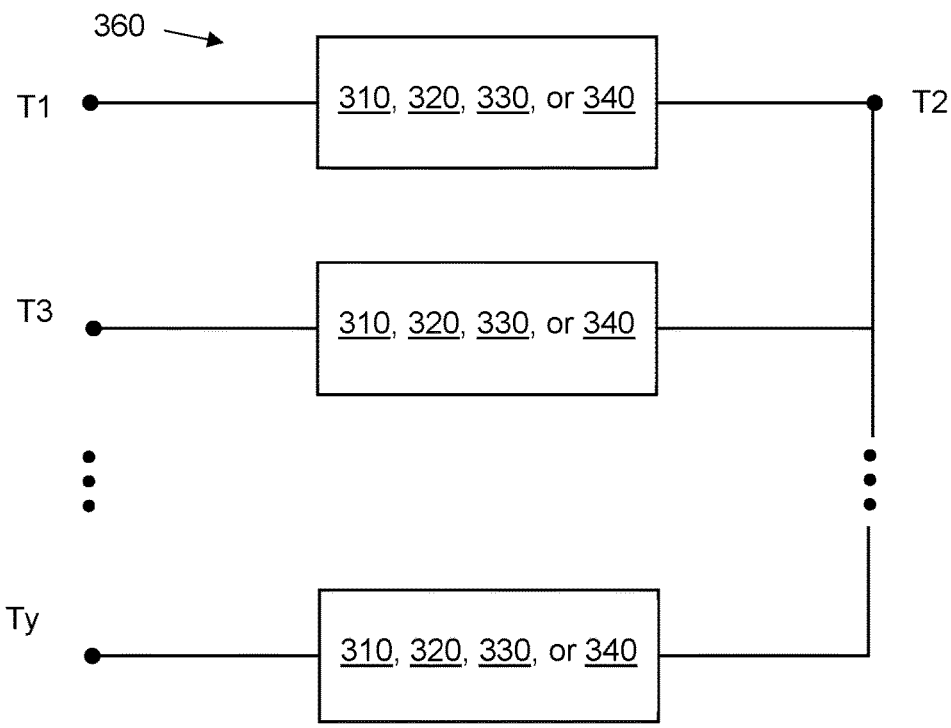
FIG. 3F shows a block-diagram depicting n-storage device isolation components connected between multiple sources and single load.

Reference is now made to FIG. 3F, which shows a block-diagram depicting n storage device isolation components 360 connected between multiple sources and a single load. Each of isolation components 360 may comprise one of isolation components 310, 320, 330, or 340, where one side may be connected to one of terminals T1, T3 through Ty and the other side may be connected to terminal T2. The structure and operation of components 310, 320, 330, or 340 may be described in FIGS. 3A through 3D.

Figure 3G:
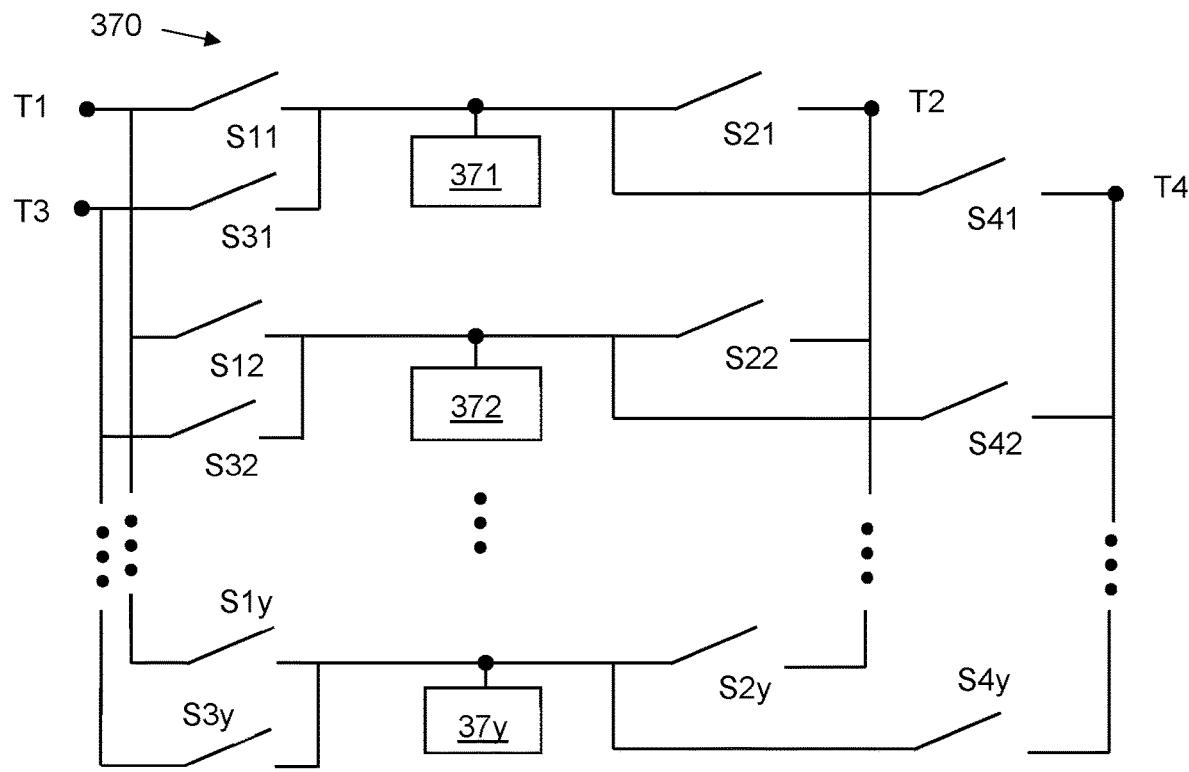
FIG. 3G shows a block-diagram depicting n-storage device isolation components connected between two sources and two loads.

Reference is now made to FIG. 3G, which shows a block-diagram depicting n-storage device isolation component 370 connected between two sources and two loads. Isolation component 370 may comprise storage devices 371, 372, and so on through 37y. For each storage device 371-37y, one side may be connected to one of terminals T1 and T3 using switches S11-S1y or S31-S3y. The other side of each storage device 371-37y, may be connected to one of terminal T2 and T4 using switches S21-S2y or S41-S4y. As may be in FIGS. 3A through 3D, for each storage devices 371-37y, the source switch may be connected after the load switch has been disconnected, and each load switch may be connected after source switch has been disconnected. Or alternatively, for each switch-storage-switch set:
  The switch connected to the load terminal may be opened, and the storage device may be disconnected from the load terminal.

After a delay has passed since the switch connected to the load terminal has been opened, the switch connected to the source terminal may be closed, connecting the source terminal to the storage device.

The switch connected to the source terminal may be opened, and the storage device may be disconnected from the source terminal.

After a delay has passed since the switch connected to source terminal has been opened, the switch connected to the load terminal may be closed, connecting the load terminal to the storage device.

Thereby switches may be opened or closed in a BBM transition. Thus, a BBM connection may be maintained and isolation component 370 may maintain isolation between terminals T1, T2, T3, and T4.

Figure 3H:
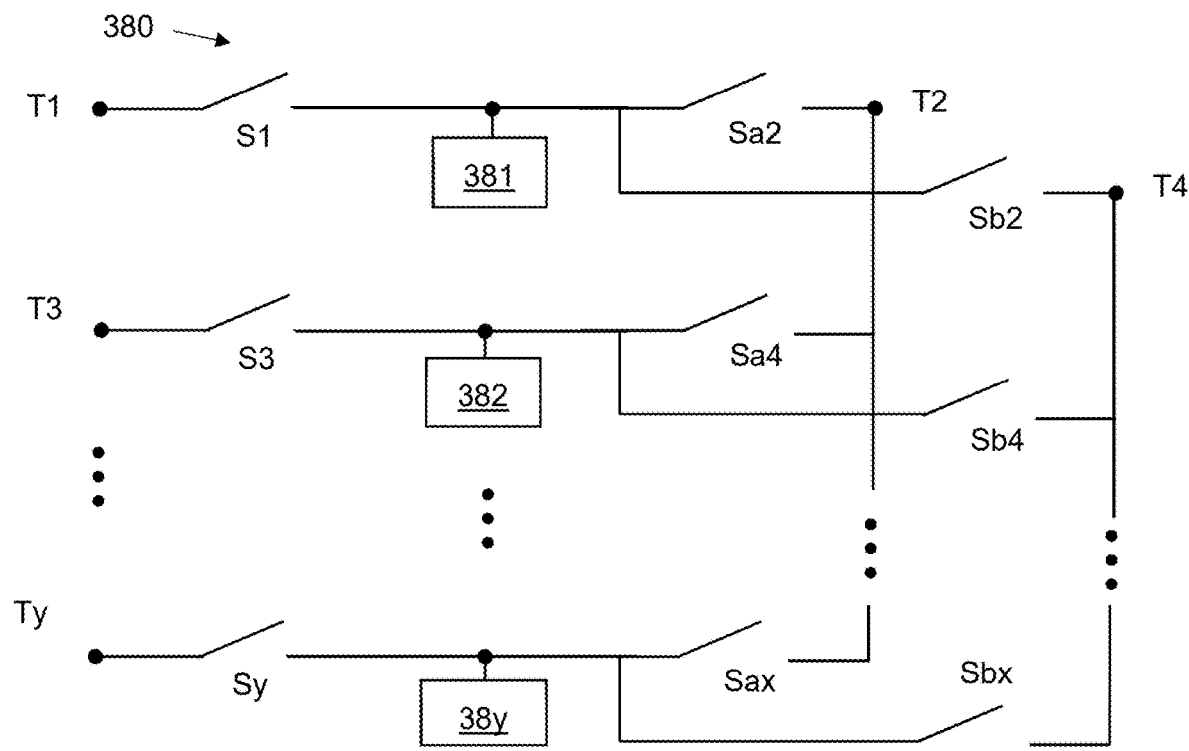
FIG. 3H shows a block-diagram depicting n-storage device isolation components connected between multiple sources and two loads.

Reference is now made to FIG. 3H, which shows a block-diagram depicting n-storage device isolation component 380 connected between multiple sources and two loads. Isolation component 380 may comprise storage devices 381, 382, and so on through 38y. For each storage device 381-38y, one side may be connected to one of terminals T1 through Ty using switches S1, S3, and so on through Sy. The other side of each storage devices 381-38y, may be connected to one of terminal T2 and T4 using switches Sa2-Sax or Sb2-Sbx, where x is 2*y. As in FIGS. 3A through 3D, for each storage devices 381-38y, the source switch may be connected after the load switch has been disconnected, and each load switch may be connected after source switch has been disconnected. Or alternatively, for each switch-storage-switch set:

The switch connected to the load terminal may be opened, and the storage device may be disconnected from the load terminal.

After a delay has passed since the switch connected to the load terminal has been opened, the switch connected to the source terminal may be closed, connecting the source terminal to the storage device.

The switch connected to the source terminal may be opened, and the storage device may be disconnected from the source terminal.

After a delay has passed since the switch connected to source terminal has been opened, the switch connected to the load terminal may be closed, connecting the load terminal to the storage device.

Thereby switches may be opened or closed in a BBM transition. Thus, a BBM connection may be maintained and isolation component 380 may maintain isolation between terminals T1, T2, T3, T4, and so on through Ty.

Figure 3I:
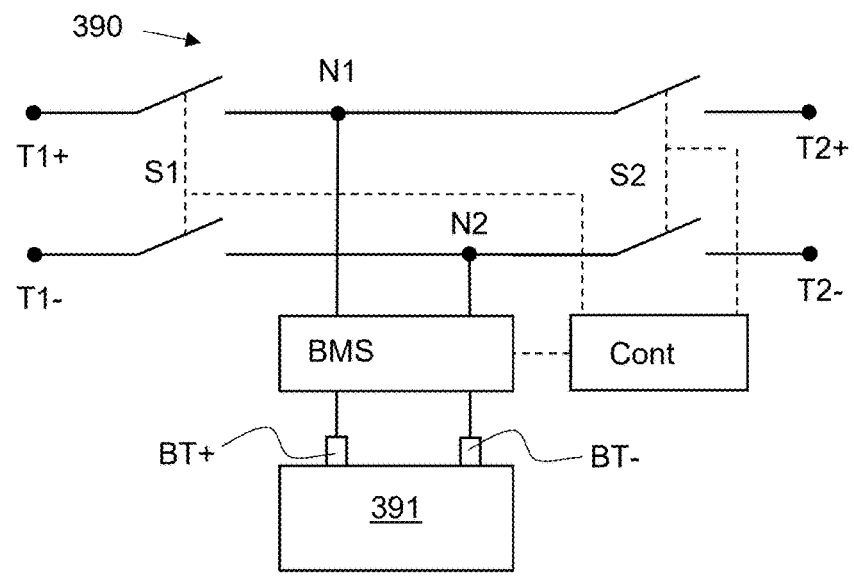
FIG. 3I shows a circuit-diagram depicting a single-storage device isolation component connected between a single source and single load.

Reference is now made to FIG. 3I, which shows a circuit-diagram depicting a single-storage device isolation component 390 connected between a single source and single load. In this figure, DC source terminals are T1+ and T1− and the DC load terminals are T2+ and T2−, showing the terminals as individual conductors instead of schematic representations of connections as may be in FIGS. 3A to 3H. Isolation component 390 includes electrical energy storage device 391. Electrical energy storage device 391 includes battery terminals BT+ and BT−, connected to circuit nodes N1 and N2. Isolation component 390 includes dual pole single throw switches S1 and S2. Switch S1 may be connected between terminals T1+/T1− and circuit nodes N1/N2. Switch S2 may be connected between terminals T2+/T2− and circuit nodes N1/N2. Switch S1 may be closed, connecting to terminals T1+/T1− to the storage device terminals BT+/BT−, after switch S2 has opened disconnecting the storage device terminals BT+/BT− from T2+/T2−. Switch S2 may be closed, connecting T2+/T2− to the storage device terminals BT+/BT1, after switch S1 has opened, disconnecting the storage device terminals BT+/BT1 from T1+/T1−. In this transition, a BBM connection may be maintained and isolation component 390 may maintain isolation between terminals T1+/T1− and T2+/T2−.

Figure 4:
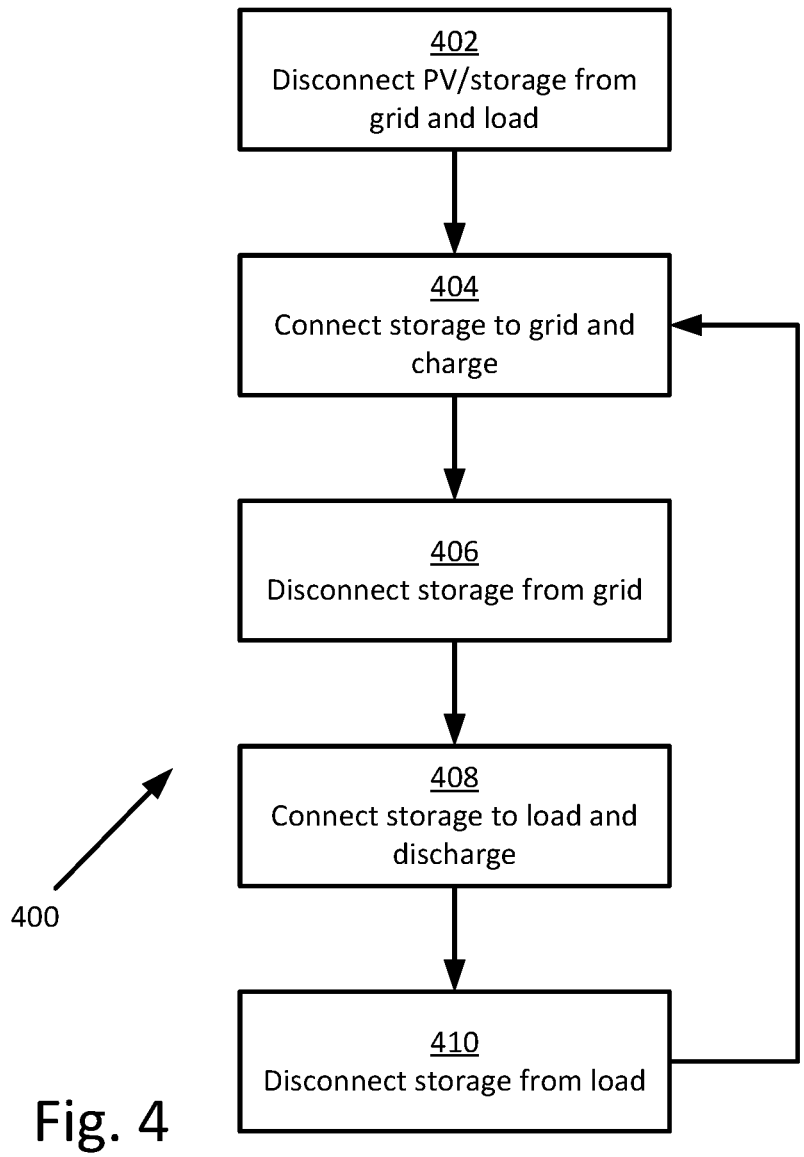
FIG. 4 shows a flowchart of a method for using an energy storage device to transfer power from a source to a load.

Reference is now made to FIG. 4, which shows a flowchart 400 of a method for using an energy storage device to transfer power from a source to a load. At step 402, the photovoltaic (PV) system or storage may be disconnected from the grid and load. At step 404, the storage may be connected to the grid and the storage device may be charged. At step 406 the storage device may be disconnected from the grid. At step 408, storage may be connected to the load and the storage may be discharged to the load. At step 410, the storage may be disconnected from the load. Subsequent to step 410, the processor may initiate step 404 and repeat the cycle until the load has been fully charged. This method operates on the earlier-disclosed apparatuses, and detailed examples may be inferred from the complete disclosure taken as a whole.

Figure 5:
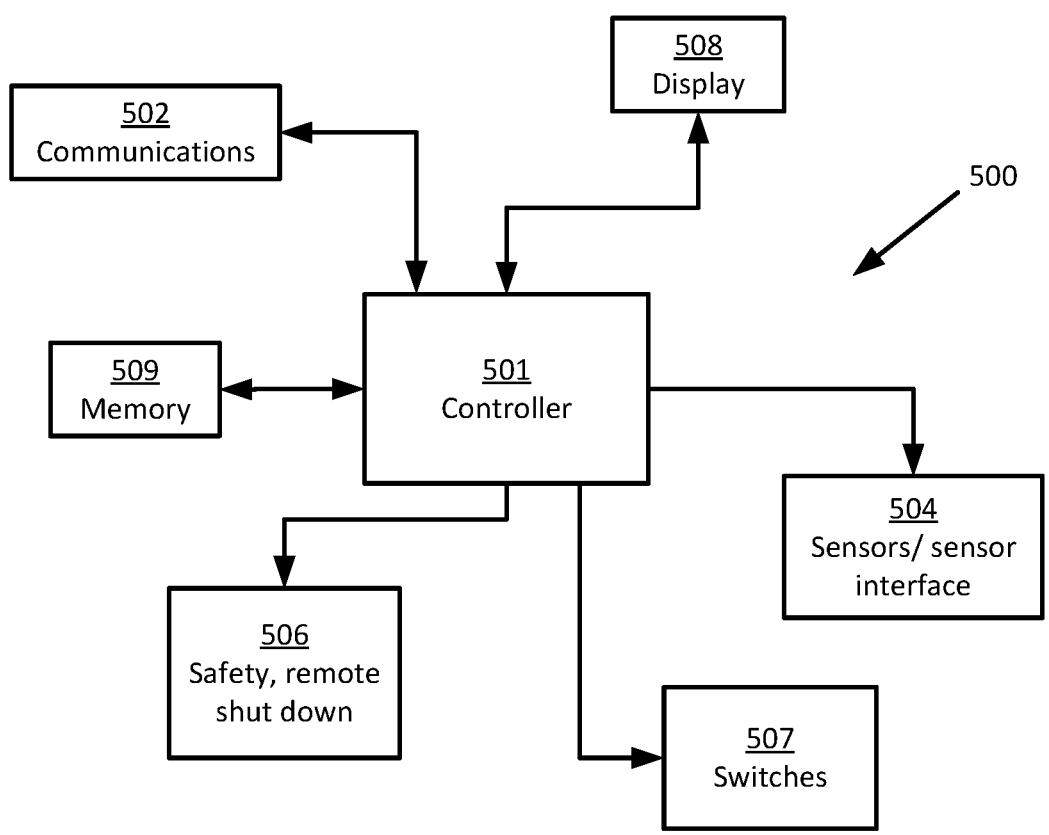
FIG. 5 shows a block-diagram depicting a device for controlling switches of an isolation component.

Reference is now made to FIG. 5, which shows a block-diagram depicting a device 500 for controlling switches of an isolation component. Device 500 comprises controller 501, memory 509, communications module 502, sensors or sensors interfaces 504, and switches interface 507. Device 500 may comprise a display 508. Device 500 may comprise a safety and remote shutdown interface 506.

FIGS. 6A through 6D are alternative illustrations of the circuit diagrams disclosed throughout this application, and may be considered supplemental description regarding the earlier circuits. As a non-limiting example, the diagram of FIGS. 6A though 6D may be associated with any of the diagrams of FIGS. 1A through 1H, 3A through 3I, and FIG. 5 and the method of FIG. 4, along with the associated text with these figures. The circuits of FIGS. 6A though 6D are variations of the earlier disclosed circuit examples and provide a supplemental description of variations in the technical aspects disclosed.

Reference is now made to FIG. 6A, which shows a block-diagram depicting a single storage-based isolation component 600. Isolation component 600 may be used to isolate between a utility grid 601 and an EV 607. EV 607 may include a battery and a built in converter, where the converter may be bidirectional and may be configured to handle charging and discharging the EV battery. Isolation component 600 may include a switch S1 between storage component 604 and grid 601. Storage component 604 may include a battery and a built in converter, where the converter may be bidirectional and may be configured to handle charging and discharging the battery. Isolation component 600 may include a switch S2 between storage component 604 and EV 607.

Switches S1 and S2 may include a controller configured to disconnect S1 before connecting S2, and disconnect S2 before connecting S1 (break-before-make). For example, after disconnecting one switch the controller delays connecting the other switch between 1 and 100 milliseconds. In some configurations, the controller may delay for longer, such as between greater than 100 milliseconds and 10 minutes. The switches S1 and S2 may be electromechanical relays, field effect transistors (FETs), or insulated-gate bipolar transistors (IGBTs). The switches S1 and S2 may be dual-pole, single-throw switches, comprising separate poles for the storage battery terminals as in FIG. 3I. This paragraph refers to switches S1 and S2 of isolation component 600, but the disclosures of this paragraph may also apply to switches S1A, S1B, S1C, S2A, S2B, and S2C of isolation components 610, 620, and 630.

For example, the BBM switching delay may be between 100 milliseconds and 10 minutes when the battery of storage component 604 needs time to recover electrically, chemically, and/or thermally after charging or discharging. For example, when the temperature of a storage battery reaches an upper limit threshold of a configured battery operating temperature range, the controller may lower a current through the battery to lower the heat produced by the storage component 604. When the charge or discharge is complete, the controller may delay the switch to allow the battery to cool down until the battery temperature is below a lower temperature threshold. This paragraph refers to storage component 604 of isolation component 600, but the disclosures of this paragraph also apply to storage component 604A, 604B, and 604C of isolation components 610, 620, and 630.

Reference is now made to FIG. 6B, which shows a block-diagram depicting a dual storage-based isolation component 610. Isolation component 610 may be used to isolate between a utility grid 601 and an EV 607. Isolation component 610 may include a switch S1A between storage component 604A and grid 601. Isolation component 610 may include a switch S1B between storage component 604B and grid 601. Storage components 604A and 604B may each include a battery and a built-in converter, where the converter may be bidirectional and may be configured to handle charging and discharging the respective battery. Isolation component 610 may include a switch S2A between storage component 604A and EV 607. Isolation component 610 may include a switch S2B between storage component 604B and EV 607.

Switches S1A, S2A, S1B and S2B may include a controller (each separately or share one controller) configured to disconnect S1A before connecting S2A, disconnect S2A before connecting S1A, disconnect S1B before connecting S2B, and/or disconnect S2B before connecting S1B (break-before-make). For example, after disconnecting one switch, the controller delays connecting the corresponding other switch between 1 and 100 milliseconds. In some configurations, the controller delays for longer, such as between greater than 100 millisecond and up to 10 minutes or more.

Figure 6C:
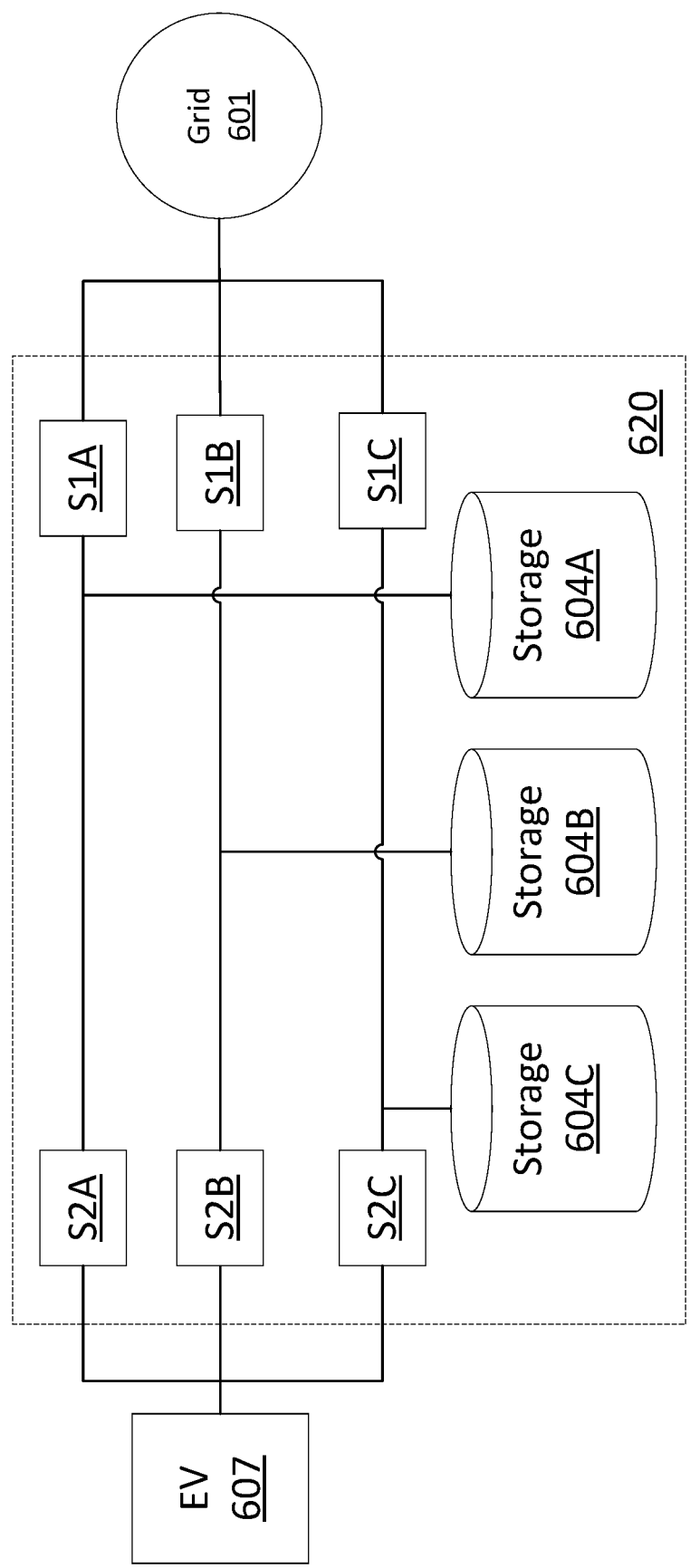
FIG. 6C shows a block-diagram depicting a triple storage-based isolation component.

Reference is now made to FIG. 6C, which shows a block-diagram depicting a triple storage-based isolation component 620. Isolation component 620 may be used to isolate between a utility grid 601 and an EV 607. Isolation component 620 may include a switch S1A between storage component 604A and grid 601. Isolation component 620 may include a switch S1B between storage component 604B and grid 601. Isolation component 620 may include a switch S1C between storage component 604C and grid 601. Storage components 604A, 604B, and 604C may each include a battery and a converter, where the converter may be bidirectional and may be configured to handle charging and discharging the respective battery. Isolation component 620 may include a switch S2A between storage component 604A and EV 607. Isolation component 620 may include a switch S2B between storage component 604B and EV 607. Isolation component 620 may include a switch S2C between storage component 604C and EV 607.

An advantage of having a triple parallel storage isolation component is that the controller may be configured for soft-switching, where soft switching means that the source (grid 601 or EV 607) and load (EV 607 or grid 601) always have at least one storage component 604A, 604B, or 604C connected to each at all times. When one battery comes close to a state of being depleted, another at least partially charged battery may be connected to the load before the depleted battery is disconnected. Similarly, when one battery comes close to a state of being fully charged, another depleted battery may be connected to the source before the charged battery is disconnected. When both a charged and a depleted battery are connected in parallel to the source or load, current may flow form the charged battery to the depleted battery until one of them is disconnected (ideally, the disconnection takes place when the current to the disconnected battery is zero—such as soft-switching).

Figure 6D:
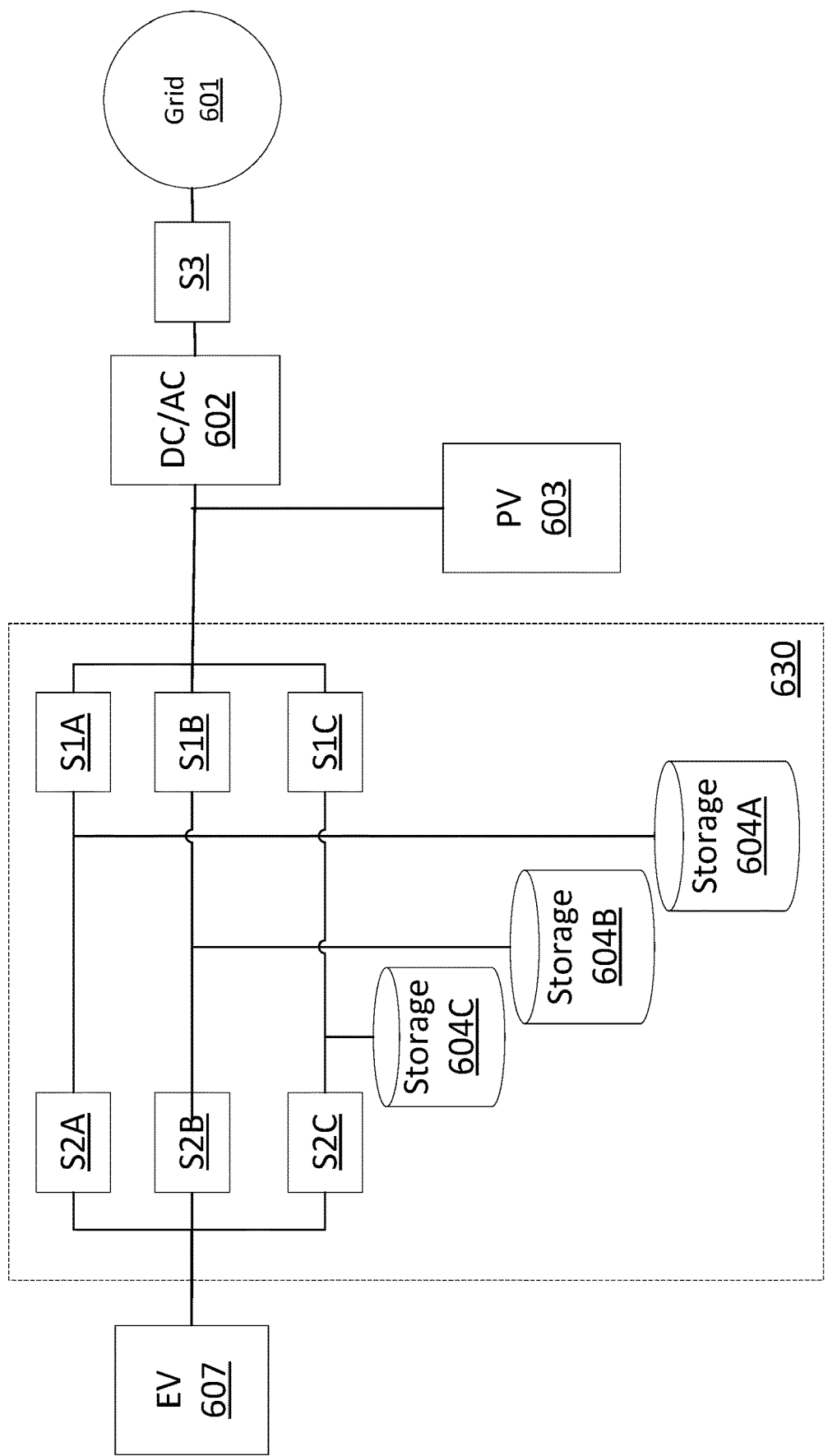
FIG. 6D shows a block-diagram depicting a triple storage-based isolation component connected to a solar system.

Reference is now made to FIG. 6D, which shows a block-diagram depicting a triple storage-based isolation component 630 connected to a solar system 602 and 603. Isolation component 630 may be used to isolate between a utility grid 601 and an EV 607. Isolation component 630 may include a switch S1A between storage component 604A and grid 601. Isolation component 630 may include a switch S1B between storage component 604B and grid 601. Isolation component 630 may include a switch S1C between storage component 604C and grid 601. Storage components 604A, 604B, and 604C may each include a battery and a converter, where the converter may be bidirectional and may be configured to handle charging and discharging the respective battery. Isolation component 630 may include a switch S2A between storage component 604A and EV 607. Isolation component 630 may include a switch S2B between storage component 604B and EV 607. Isolation component 630 may include a switch S2C between storage component 604C and EV 607. The system of FIG. 6D may include a photovoltaic (PV) array 603. The system of FIG. 6D may include a bidirectional DC/AC converter (such as a bidirectional inverter). The system of FIG. 6D may include a switch S3 (such as a relay, FET, or IGBT) for disconnecting the grid 601 from the DC/AC converter 602, thereby allowing the PV array to charge the battery directly by closing switches S1A and S2A, switches S1B and S2B, or switches S1C and S2C. Switch S3 may be incorporated into DC/AC converter 602.

Following are clauses describing this disclosure:

Clause 1. An apparatus comprising:
- a plurality of circuit nodes, wherein the plurality of circuit nodes are configured to transfer input and output (I/O) power;
- an isolation component;
- a first plurality of switches; and
- a controller configured to selectively operate the first plurality of switches to:
- in a first mode of operation, connect a first node of the plurality of circuit nodes to a second node of the plurality of circuit nodes via the isolation component; and,
- in a second mode of operation, connect the first node to the second node.

Clause 2. The apparatus of clause 1, wherein the first plurality of switches selectively connects the plurality of circuit nodes to the isolation component.

Clause 3. The apparatus of clauses 1 or 2, wherein each of the first plurality of switches comprises at least one of a transistor, field-effect transistor (FET), or a relay.

Clause 4. The apparatus of any one of clauses 1-3, wherein the first plurality of switches connect at least some of the plurality of circuit nodes to at least one other node of the plurality of circuit nodes.

Clause 5. The apparatus of any one of clauses 1-4, wherein the first node is connected to at least one of: an alternating current (AC) grid, a direct current (DC) power source, or
a battery.
Clause 6. The apparatus of any one of clauses 1-5, wherein the second node is connected to an electric vehicle (EV).
Clause 7. The apparatus of any one of clauses 1-4, wherein the first node is connected to a direct current (DC) power source and further comprising a DC to DC (DC/DC) converter coupled between the DC power source and the first node.
Clause 8. The apparatus of any one of clauses 1-4, wherein the first node is connected to a battery and further comprising a DC/DC converter coupled between the battery and the first node.
Clause 9. The apparatus of any one of clauses 1-4, wherein the first node is connected to an AC grid and further comprising an AC to DC (AC/DC) converter coupled between the AC grid and the first node.
Clause 10. The apparatus of any one of clauses 1-4, further comprising a direct current to alternating current (DC/AC) converter coupled between a DC power source and an AC grid.
Clause 11. The apparatus of any one of clauses 1-10, wherein the isolation component comprises:
a core,
a first winding,
a second winding, wherein the first winding is inductively coupled to the second winding using the core,
a second plurality of switches coupled between the first winding and the first node, and
a third plurality of switches coupled between the second winding and the second node.
Clause 12. The apparatus of clause 11, wherein the second plurality of switches is configured as an H-bridge.
Clause 13. The apparatus of clauses 11 or 12, wherein each switch of the second plurality of switches comprises at least one of a transistor, a FET, or a relay.
Clause 14. The apparatus of clause 11, wherein the third plurality of switches is configured as an H-bridge.
Clause 15. The apparatus of clause 11 or 14, wherein each switch of the third plurality of switches comprises at least one of a transistor, a FET, or a relay.
Clause 16. The apparatus of clause 11, wherein the second plurality of switches comprises a diode bridge.
Clause 17. The apparatus of clause 11, wherein the third plurality of switches comprises a diode bridge.
Clause 18. The apparatus of any one of clauses 1-17, further comprising a third node of the plurality of circuit nodes connected in series to the first node and to the second plurality of switches.
Clause 19. The apparatus of any one of clauses 1-17, further comprising a third node of the plurality of circuit nodes connected in parallel to the first node and to the second plurality of switches.
Clause 20. The apparatus of any one of clauses 11-19, wherein other nodes of the plurality of circuit nodes are connected in series to the first node and to the second plurality of switches.
Clause 21. The apparatus of any one of clauses 11-19, wherein other nodes of the plurality of circuit nodes are connected in parallel to the first node and to the second plurality of switches.
Clause 22. The apparatus of any one of clauses 11-21, wherein the controller is further configured to:
selectively operate the first plurality of switches to, in a third mode of operation, connect a third node of the plurality of circuit nodes to the first node or the second node via the isolation component, and,
in a fourth mode of operation, connect the third node to the first node or the second node; and
wherein the isolation component further comprises:
a third winding, wherein the third winding is inductively coupled to the first
winding and the second winding using the core;
a fourth plurality of switches connected between the third winding and the third node.
Clause 23. The apparatus of clause 22, wherein the fourth plurality of switches is configured as an H-bridge
Clause 24. The apparatus of clause 22, wherein each switch of the fourth plurality of switches is a transistor, a FET, or a relay.
Clause 25. The apparatus of clause 22, wherein the fourth plurality of switches comprises a diode bridge.
Clause 26. The apparatus of any one of clauses 11-25, wherein the controller is further configured to selectively operate the first plurality of switches to:
in a fifth mode of operation, connect a fourth node of the plurality of circuit nodes to the first node or the second node via the isolation component, and,
in a sixth mode of operation, connect the fourth node to the first node or the second node; and
wherein the isolation component further comprises:
a fourth winding surrounding the core;
a fifth plurality of switches coupled between the fourth winding and the fourth node.
Clause 27. The apparatus of clause 26, wherein the fifth plurality of switches is configured as an H-bridge.
Clause 28. The apparatus of clause 26, wherein each switch of the fifth plurality of switches is a transistor, a FET, or a relay.
Clause 29. The apparatus of clause 26, wherein the fifth plurality of switches comprises a diode bridge.
Clause 30. The apparatus of any one of clauses 11-29, wherein the controller is further configured to selectively operate the first plurality of switches to:
in a seventh mode of operation, connect a fifth node of the plurality of circuit nodes to the first node or the second node via the isolation component, and,
in an eighth mode of operation, connect the fifth node to the first node or the second node; and
wherein the isolation component further comprises:
a fifth winding surrounding the core;
a sixth plurality of switches coupled between the fifth winding and the fifth node.
Clause 31. The apparatus of clause 30, wherein the sixth plurality of switches is configured as an H-bridge.
Clause 32. The apparatus of clause 30, wherein each switch of the sixth plurality of switches is a transistor, a FET, or a relay.
Clause 33. The apparatus of clause 30, wherein the sixth plurality of switches comprises a diode bridge.
Clause 34. The apparatus of any one of clauses 1-8, wherein the isolation component comprises:
a first electrical energy storage device;
a first switch coupled between the first node and the first electrical energy storage device; and
a second switch coupled between the second node and the first electrical energy storage device;
wherein the controller is configured to perform switching of the first switch and the second switch in a break-before-make transition.
Clause 35. The apparatus of clause 34, wherein the controller is further configured to operate the first switch and the second switch in a break-before-make transition by only closing the first switch after the second switch has opened, and only closing the second switch after the first switch has opened.

Clause 36. The apparatus of any one of clauses 34 or 35, wherein the first electrical energy storage device comprises at least one of a battery, a capacitor, or a super capacitor.

Clause 37. The apparatus of any one of clauses 34-36, wherein the controller is configured to create a delay between opening the first switch and closing the second switch or between opening the second switch and closing the first switch, wherein the delay is between 1 millisecond and 100 milliseconds.

Clause 38. The apparatus of any one of clauses 34-36, wherein the controller is configured to create a delay between opening the first switch and closing the second switch or between opening the second switch and closing the first switch, wherein the delay is greater than 100 milliseconds.

Clause 39. The apparatus of any one of clauses 34-38, wherein the isolation component further comprises:
a second electrical energy storage device;
a third switch coupled between the first node and the second electrical energy storage device; and
a fourth switch coupled between the second node and the second electrical energy storage device;
wherein the controller is configured to perform switching of the third switch and the fourth switch in a break-before-make transition.

Clause 40. The apparatus of clause 39, wherein the controller is further configured to operate the third switch and fourth switch in a break-before-make transition by only closing the third switch after the fourth switch has opened, and only closing the fourth switch after the third switch has opened.

Clause 41. The apparatus of any one of clauses 39 or 40, wherein the second electrical energy storage device comprises a battery, a capacitor, or a super capacitor.

Clause 42. The apparatus of any one of clauses 39-41, wherein the controller is configured to create a second delay between opening the first switch and closing the second switch or between opening the second switch and closing the first switch, wherein the second delay is between 1 millisecond and 100 milliseconds.

Clause 43. The apparatus of any one of clauses 34-42, wherein the isolation component further comprises:
a third electrical energy storage device;
a fifth switch coupled between the first node and the third electrical energy storage device; and
a sixth switch coupled between the second node and the third electrical energy storage device;
wherein the controller is configured to perform switching of the fifth switch and the sixth switch in a break-before-make transition.

Clause 44. The apparatus of clause 43, wherein the controller is further configured to operate the fifth switch and sixth switch in a break-before-make transition by only closing the fifth switch after the sixth switch has opened, and only closing the sixth switch after the fifth switch has opened.

Clause 45. The apparatus of any one of clauses 43 or 44, wherein the second electrical energy storage device comprises a battery, a capacitor, or a super capacitor.

Clause 46. The apparatus of any one of clauses 43-45, wherein the controller is configured to create a third delay between opening the fifth switch and closing the sixth switch or between opening the sixth switch and closing the fifth switch, wherein the third delay is between 1 millisecond and 100 milliseconds.

Clause 47. The apparatus of any one of clauses 43-46, wherein the controller is further configured to perform a make-before-break transition by:
close the third switch before opening the first switch or the fifth switch;
close the first switch before opening the third switch or the fifth switch;
close the fifth switch before opening the first switch or the third switch;
close the second switch before opening the fourth switch or the sixth switch;
close the fourth switch before opening the second switch or the sixth switch; or
close the sixth switch before opening the second switch or the fourth switch.

Clause 48. The apparatus of any one of clauses 1-8, wherein the isolation component comprises:
a first electrical energy storage device connected to the first node;
a second electrical energy storage device connected to the second node;
a third electrical energy storage device;
a first switch coupled between the first electrical energy storage device and the third electrical energy storage device; and
a second switch coupled between the second electrical energy storage device and the third electrical energy storage device;
wherein the controller is further configured to only close the first switch after the second switch has opened, and wherein the controller is further configured to only close the second switch after the first switch has opened.

Clause 49. The apparatus of clause 48, wherein the controller is further configured to operate the first switch and second switch in a break-before-make transition.

Clause 50. The apparatus of any one of clauses 48 or 49, wherein the first electrical energy storage device, second electrical energy storage device, or third electrical energy storage device comprises a battery, a capacitor, or a super capacitor.

Clause 51. The apparatus of any one of clauses 48-50, further comprising a delay between opening the first switch and closing the second switch or between opening the second switch and closing the first switch, wherein the delay is between 1 millisecond and 100 milliseconds.

Clause 52. The apparatus of any one of clauses 1-8, wherein the isolation component comprises:
a plurality of electrical paths between the first node and the second node, wherein each path of the plurality of electrical paths comprises:
an electrical energy storage device;
a first switch coupled between the first node and the electrical energy storage device; and
a second switch coupled between the second node and the electrical energy storage device;
wherein the controller is further configured, for each path of the plurality of electrical paths, to only close the first switch after the second switch has opened, and to only close the second switch after the first switch has opened.

Clause 53. The apparatus of clause 52, wherein the controller is further configured, for each path of the plurality of electrical paths, to operate the first switch and second switch in a break-before-make transition.

Clause 54. The apparatus of any one of clauses 52 or 53, wherein, for each path of the plurality of electrical paths, the electrical energy storage device comprises a battery, a capacitor, or a super capacitor.

Clause 55. The apparatus of any one of clauses 52-54, further comprising, for each path of the plurality of electrical paths, a delay between opening the first switch and closing the second switch or between opening the second switch and closing the first switch, wherein the delay is between 1 millisecond and 100 milliseconds.

Clause 56. An apparatus comprising:
a plurality of circuit nodes, wherein the plurality of circuit nodes are configured to transfer input and output (I/O) power;
a plurality of electrical energy storage devices;
a plurality of switches; and
a controller configured to selectively operate the plurality of switches to:
in a first mode of operation, transfer power from a first subset of the plurality of circuit nodes to a second subset of the plurality of circuit nodes using the plurality of electrical energy storage devices, wherein each device of the plurality of electrical energy storage devices uses a respective subset of switches of the plurality of switches to alternately connect between the first subset and the second subset without being connected to both the first subset and the second subset concurrently, and,
in a second mode of operation, transfer power from the first subset to the second subset without using the plurality of electrical energy storage devices.

Clause 57. An apparatus comprising:
an isolation component;
a plurality of input nodes;
at least one output node; and
a first plurality of switches configured to selectively connect each of the plurality of input nodes to the isolation component, and to selectively connect the at least one output node to the isolation component; and
a controller configured to:
connect, using the plurality of switches, at least some nodes of the plurality of input nodes to the isolation component, and
connect, using the first plurality of switches, the at least one output node to the isolation component.

Clause 58. The apparatus of clause 57, wherein the at least some nodes are connected to the isolation component based on an available power from each of the plurality of input nodes and a desired power of the at least one output node.

Clause 59. The apparatus of any one of clauses 57 or 58, wherein the controller is further configured to:
disconnect the at least some nodes from the isolation component; or
disconnect the at least one output node from the isolation component.

Clause 60. The apparatus of any one of clauses 57-59, wherein each of the first plurality of switches comprises at least one of a transistor, field-effect transistor (FET), and a relay.

Clause 61. The apparatus of any one of clauses 57-60, wherein the first plurality of switches are configured to connect at least one of the plurality of input nodes to the at least one output node, and wherein the controller is configured to connect at least one of the plurality of input nodes to the at least one output node.

Clause 62. The apparatus of any one of clauses 57-61, wherein the plurality of switches comprises relays.

Clause 63. The apparatus of any one of clauses 57-62, wherein the at least one output node is configured to provide power to at least one electric vehicle (EV).

Clause 64. The apparatus of any one of clauses 57-63, further comprising terminals, wherein each of the terminals is configured to be connected to at least one of:
an alternating current (AC) grid,
an AC generator,
a photovoltaic array,
a wind turbine,
a direct current (DC) generator,
a battery, and
an EV.

Clause 65. The apparatus of any one of clauses 57-64, further comprising a DC bus and an AC bus, wherein the DC bus is connected to at least one DC power source, wherein the AC bus is connected to at least one AC power source, and wherein each of the plurality of input nodes is connected to the DC bus or the AC bus.

Clause 66. The apparatus of clause 65, further comprising at least one DC to DC power converter connected between the DC bus and at least some of the plurality of input nodes.

Clause 67. The apparatus of any one of clauses 65 or 66, further comprising at least one AC to DC power converter connected between at least some of the plurality of input nodes and the AC bus.

Clause 68. The apparatus of clause 65, further comprising at least one DC to AC power converter connected between the DC bus and the AC bus.

Clause 69. The apparatus of any one of clauses 57-68, wherein the isolation component comprises:
a core,
a first winding,
a second winding, wherein the first winding is inductively coupled to the second winding using the core,
a second plurality of switches coupled between the first winding and the first node, and
a third plurality of switches coupled between the second winding and the second node.

Clause 70. The apparatus of clause 69, wherein the second plurality of switches is configured as an H-bridge.

Clause 71. The apparatus of any one of clauses 69 or 70, wherein each switch of the second plurality of switches comprises at least one of a transistor, a FET, or a relay.

Clause 72. The apparatus of clause 69, wherein the third plurality of switches is configured as an H-bridge.

Clause 73. The apparatus of any one of clauses 69 or 72, wherein each switch of the third plurality of switches comprises at least one of a transistor, a FET, or a relay.

Clause 74. The apparatus of clause 69, wherein the second plurality of switches comprises a diode bridge.

Clause 75. The apparatus of clause 69, wherein the third plurality of switches comprises a diode bridge.

Clause 76. The apparatus of any one of clauses 57-75, further comprising a third node of the plurality of circuit nodes connected in series to the first node and to the second plurality of switches.

Clause 77. The apparatus of anyone of clauses 57-75, further comprising a third node of the plurality of circuit nodes connected in parallel to the first node and to the second plurality of switches.

Clause 78. The apparatus of any one of clauses 69-77, wherein other nodes of the plurality of circuit nodes are connected in series to the first node and to the second plurality of switches.

Clause 79. The apparatus of any one of clauses 69-77, wherein other nodes of the plurality of circuit nodes are connected in parallel to the first node and to the second plurality of switches.

Clause 80. The apparatus of any one of clauses 69-79, wherein the controller is further configured to:
selectively operate the first plurality of switches to, in a third mode of operation, connect a third node of the plurality of circuit nodes to the first node or the second node via the isolation component, and,
in a fourth mode of operation, connect the third node to the first node or the second node; and
wherein the isolation component further comprises:
a third winding, wherein the third winding is inductively coupled to the first winding and the second winding using the core;
a fourth plurality of switches connected between the third winding and the third node.

Clause 81. The apparatus of clause 80, wherein the fourth plurality of switches is configured as an H-bridge Clause 82. The apparatus of clause 80, wherein each switch of the fourth plurality of switches is a transistor, a FET, or a relay.

Clause 83. The apparatus of clause 80, wherein the fourth plurality of switches comprises a diode bridge.

Clause 84. The apparatus of any one of clauses 69-83, wherein the controller is further configured to selectively operate the first plurality of switches to:
in a fifth mode of operation, connect a fourth node of the plurality of circuit nodes to the first node or the second node via the isolation component, and,
in a sixth mode of operation, connect the fourth node to the first node or the second node; and
wherein the isolation component further comprises:
a fourth winding surrounding the core;
a fifth plurality of switches coupled between the fourth winding and the fourth node.

Clause 85. The apparatus of clause 84, wherein the fifth plurality of switches is configured as an H-bridge.

Clause 86. The apparatus of clause 84, wherein each switch of the fifth plurality of switches is a transistor, a FET, or a relay.

Clause 87. The apparatus of clause 84, wherein the fifth plurality of switches comprises a diode bridge.

Clause 88. The apparatus of any one of clauses 69-87, wherein the controller is further configured to selectively operate the first plurality of switches to:
in a seventh mode of operation, connect a fifth node of the plurality of circuit nodes to the first node or the second node via the isolation component, and,
in an eighth mode of operation, connect the fifth node to the first node or the second node; and
wherein the isolation component further comprises:
a fifth winding surrounding the core;
a sixth plurality of switches coupled between the fifth winding and the fifth node.

Clause 89. The apparatus of clause 88, wherein the sixth plurality of switches is configured as an H-bridge.

Clause 90. The apparatus of clause 88, wherein each switch of the sixth plurality of switches is a transistor, a FET, or a relay.

Clause 91. The apparatus of clause 88, wherein the sixth plurality of switches comprises a diode bridge.

Clause 92. The apparatus of any one of clauses 57-68, wherein the isolation component comprises:
a first electrical energy storage device;
a first switch coupled between the first node and the first electrical energy storage device; and
a second switch coupled between the second node and the first electrical energy storage device;
wherein the controller is further configured to close the first switch only after the second switch has opened, and wherein the controller is further configured to close the second switch only after the first switch has opened.

Clause 93. The apparatus of clause 92, wherein the controller is further configured to operate the first switch and the second switch in a break-before-make transition.

Clause 94. The apparatus of any one of clauses 92 or 93, wherein the first electrical energy storage device comprises at least one of a battery, a capacitor, or a super capacitor.

Clause 95. The apparatus of any one of clauses 92-94, wherein the controller is configured to create a delay between opening the first switch and closing the second switch or between opening the second switch and closing the first switch, wherein the delay is between 1 millisecond and 100 milliseconds.

Clause 96. The apparatus of any one of clauses 92-95, wherein the isolation component further comprises:
a second electrical energy storage device;
a third switch coupled between the first node and the second electrical energy storage device; and
a fourth switch coupled between the second node and the second electrical energy storage device;
wherein the controller is further configured to close the third switch only after the fourth switch has opened, and wherein the controller is further configured to close the fourth switch only after the third switch has opened.

Clause 97. The apparatus of clause 96, wherein the controller is further configured to operate the third switch and fourth switch in a break-before-make transition.

Clause 98. The apparatus of any one of clauses 96 or 97, wherein the second electrical energy storage device comprises a battery, a capacitor, or a super capacitor.

Clause 99. The apparatus of anyone of clauses 96-98, wherein the controller is configured to create a second delay between opening the first switch and closing the second switch or between opening the second switch and closing the first switch, wherein the second delay is between 1 millisecond and 100 milliseconds.

Clause 100. The apparatus of any one of clauses 92-99, wherein the isolation component further comprises:
a third electrical energy storage device;
a fifth switch coupled between the first node and the third electrical energy storage device; and
a sixth switch coupled between the second node and the third electrical energy storage device;
wherein the controller is further configured to close the fifth switch only after the sixth switch has opened, and wherein the controller is further configured to close the sixth switch only after the fifth switch has opened.

Clause 101. The apparatus of clause 100, wherein the controller is further configured to operate the fifth switch and sixth switch in a break-before-make transition.

Clause 102. The apparatus of any one of clauses 100 or 101, wherein the second electrical energy storage device comprises a battery, a capacitor, or a super capacitor.

Clause 103. The apparatus of any one of clauses 100-102, wherein the controller is configured to create a third delay between opening the first switch and closing the second switch or between opening the second switch and closing the first switch, wherein the third delay is between 1 millisecond and 100 milliseconds.

Clause 104. The apparatus of any one of clauses 100-103, wherein the controller is further configured to:
close the third switch before opening the first switch or the fifth switch;
close the first switch before opening the third switch or the fifth switch;
close the fifth switch before opening the first switch or the third switch;
close the second switch before opening the fourth switch or the sixth switch;
close the fourth switch before opening the second switch or the sixth switch; or
close the sixth switch before opening the second switch or the fourth switch.

Clause 105. The apparatus of any one of clauses 57-68, wherein the isolation component comprises:
a first electrical energy storage device connected to the first node;
a second electrical energy storage device connected to the second node;
a third electrical energy storage device;
a first switch coupled between the first electrical energy storage device and the third electrical energy storage device; and
a second switch coupled between the second electrical energy storage device and the third electrical energy storage device;
wherein the controller is further configured to close the first switch only after the second switch has opened, and wherein the controller is further configured to close the second switch only after the first switch has opened.

Clause 106. The apparatus of clause 105, wherein the controller is further configured to operate the first switch and second switch in a break-before-make transition.

Clause 107. The apparatus of any one of clauses 105 or 106, wherein the first electrical energy storage device, second electrical energy storage device, or third electrical energy storage device comprises a battery, a capacitor, or a super capacitor.

Clause 108. The apparatus of any one of clauses 105-107, further comprising a delay between opening the first switch and closing the second switch or between opening the second switch and closing the first switch, wherein the delay is between 1 millisecond and 100 milliseconds.

Clause 109. The apparatus of any one of clauses 57-68, wherein the isolation component comprises:
a plurality of electrical paths between the first node and the second node, wherein each path of the plurality of electrical paths comprises:
an electrical energy storage device;
a first switch coupled between the first node and the electrical energy storage device; and
a second switch coupled between the second node and the electrical energy storage device;
wherein the controller is further configured, for each path of the plurality of electrical paths, to close the first switch only after the second switch has opened, and to close the second switch only after the first switch has opened.

Clause 110. The apparatus of clause 109, wherein the controller is further configured, for each path of the plurality of electrical paths, to operate the first switch and second switch in a break-before-make transition.

Clause 111. The apparatus of any one of clauses 109 or 110, wherein, for each path of the plurality of electrical paths, the electrical energy storage device comprises a battery, a capacitor, or a super capacitor.

Clause 112. The apparatus of any one of clauses 109-111, further comprising, for each path of the plurality of electrical paths, a delay between opening the first switch and closing the second switch or between opening the second switch and closing the first switch, wherein the delay is between 1 millisecond and 100 milliseconds.

Clause 113. A method comprising:
connecting, by a controller and using a plurality of switches in a first mode of operation, a first node of a plurality of circuit nodes to a second node of the plurality of circuit nodes via an isolation component; and
connecting, by the controller and using the plurality of switches in a second mode of operation, the first node to the second node via a direct connection.

Clause 114. A method comprising:
monitoring, by a computing device, each of a plurality of input nodes for an available power;
monitoring, by the computing device, at least one output node for a desired power;
connecting, by the computing device, based on the available power and the desired power, and using a plurality of switches, at least one of the plurality of input nodes to an isolation component; and connecting, by the computing device, the at least one output node to the isolation component.

Clause 115. The method of any one of clauses 113 or 114, wherein the isolation component comprises an isolation transformer.

Clause 116. The method of any one of clauses 113 or 114, wherein the isolation component comprises a first switch, at least one electrical energy storage device, and a second switch,
wherein the electrical energy storage device comprises at least one of a battery, a capacitor, and a supercapacitor, and
wherein the method further comprises transferring power from the first node to the second node using the first switch and the second switch, wherein the first switch is connected after the second switch is disconnected, and wherein the second switch is connected after the first switch is disconnected.

What is claimed is:

1. An apparatus comprising:
a plurality of circuit nodes, wherein the plurality of circuit nodes are configured to transfer input and output (I/O) power;
an isolation component;
a first plurality of switches; and
a controller configured to selectively operate the first plurality of switches to:
in a first mode of operation, connect a first node of the plurality of circuit nodes to a second node of the plurality of circuit nodes via the isolation component; and,
in a second mode of operation, connect the first node to the second node without the isolation component,
wherein the first node is configured to connect to an AC grid and further comprising an AC-to-DC (AC/DC) converter coupled between the AC grid and the first node.

2. The apparatus of claim 1, wherein the first plurality of switches selectively connects the plurality of circuit nodes to the isolation component.

3. The apparatus of claim 1, wherein each of the first plurality of switches comprises at least one of a transistor or a relay.

4. The apparatus of claim 1, wherein the first plurality of switches connect at least some of the plurality of circuit nodes to at least one other node of the plurality of circuit nodes.

5. The apparatus of claim 1, wherein the first node is connected to at least one of:
an alternating current (AC) grid,
a direct current (DC) power source, or
a battery.

6. The apparatus of claim 1, further comprising an electric vehicle (EV), wherein the second node is configured to connect to the EV.

7. The apparatus of claim 1, wherein the first node is configured to connect to a direct current (DC) power source and further comprising a DC to DC (DC/DC) converter coupled between the DC power source and the first node.

8. The apparatus of claim 1, wherein the first node is configured to connect to a battery and further comprising a DC/DC converter coupled between the battery and the first node.

9. The apparatus of claim 1, further comprising a direct current to alternating current (DC/AC) converter configured to connect between a DC power source and an AC grid.

10. An apparatus comprising:
a plurality of circuit nodes, wherein the plurality of circuit nodes are configured to transfer input and output (I/O) power;
an isolation component:
a first plurality of switches, and
a controller configured to selectively operate the first plurality of switches to:
in a first mode of operation, connect a first node of the plurality of circuit nodes to a second node of the plurality of circuit nodes via the isolation component; and
in a second mode of operation, connect the first node to the second node without the isolation component,
wherein the isolation component comprises:
a core,
a first winding,
a second winding, wherein the first winding is inductively coupled to the second winding using the core,
a second plurality of switches coupled between the first winding and the first node, and
a third plurality of switches coupled between the second winding and the second node.

11. The apparatus of claim 10, wherein the second plurality of switches is configured as an H-bridge.

12. The apparatus of claim 10, further comprising a third node of the plurality of circuit nodes connected in series to the first node and to the second plurality of switches.

13. The apparatus of claim 10, further comprising a third node of the plurality of circuit nodes connected in parallel to the first node and to the second plurality of switches.

14. The apparatus of claim 10, wherein other nodes of the plurality of circuit nodes are connected in series to the first node and to the second plurality of switches.

15. The apparatus of claim 10, wherein other nodes of the plurality of circuit nodes are connected in parallel to the first node and to the second plurality of switches.

16. The apparatus of claim 10, wherein the controller is further configured to:
selectively operate the first plurality of switches to, in a third mode of operation, connect a third node of the plurality of circuit nodes to the first node or the second node via the isolation component, and
in a fourth mode of operation, connect the third node to the first node or the second node; and
wherein the isolation component further comprises:
a third winding, wherein the third winding is inductively coupled to the first winding and the second winding using the core; and
a fourth plurality of switches connected between the third winding and the third node.

17. An apparatus comprising:
a plurality of circuit nodes, wherein the plurality of circuit nodes are configured to transfer input and output (I/O) power:
an isolation component:
a first plurality of switches; and
a controller configured to selectively operate the first plurality of switches to:
connect a first node of the plurality of circuit nodes to a second node of the plurality of circuit nodes via the isolation component; and,
connect the first node to the second node without the isolation component,
wherein the isolation component comprises:
a first electrical energy storage device;
a first switch coupled between the first node and the first electrical energy storage device;
and a second switch coupled between the second node and the first electrical energy storage device,
wherein the controller is configured to perform switching of the first switch and the second switch in a break-before-make transition.

18. The apparatus of claim 17, wherein the controller is further configured to operate the first switch and the second switch in a break-before-make transition by only closing the first switch after the second switch has opened, and only closing the second switch after the first switch has opened.

19. The apparatus of claim 17, wherein the first electrical energy storage device comprises at least one of a battery, a capacitor, or a super capacitor.

20. The apparatus of claim 17, wherein the first node is configured to connect to an AC grid and further comprising an AC-to-DC (AC/DC) converter coupled between the AC grid and the first node.

* * * * *